US010380597B2

(12) United States Patent
Krassner et al.

(10) Patent No.: US 10,380,597 B2
(45) Date of Patent: *Aug. 13, 2019

(54) SYSTEM AND METHOD FOR CREATION, DISTRIBUTION AND TRACKING OF ADVERTISING VIA ELECTRONIC NETWORKS

(75) Inventors: Brad Krassner, Miami Beach, FL (US); Nikolai Mentchoukov, Miami Beach, FL (US); Fred Bernstein, Miami Beach, FL (US); Alan Edwards, Miami Beach, FL (US)

(73) Assignee: Rich Media Club, LLC, Miami Beach, FL (US)

(*) Notice: Subject to any disclaimer, the term of this patent is extended or adjusted under 35 U.S.C. 154(b) by 682 days.

This patent is subject to a terminal disclaimer.

(21) Appl. No.: 11/643,245

(22) Filed: Dec. 21, 2006

(65) Prior Publication Data
US 2007/0150353 A1 Jun. 28, 2007

Related U.S. Application Data

(60) Provisional application No. 60/753,536, filed on Dec. 24, 2005.

(51) Int. Cl.
*G06Q 30/00* (2012.01)
*G06Q 30/02* (2012.01)

(52) U.S. Cl.
CPC .......... *G06Q 30/00* (2013.01); *G06Q 30/02* (2013.01); *G06Q 30/0251* (2013.01);
(Continued)

(58) Field of Classification Search
CPC .......... G06Q 30/0251; G06Q 30/0254; G06Q 30/0256; G06Q 30/0261; G06Q 30/0269;
(Continued)

(56) References Cited

U.S. PATENT DOCUMENTS 5,572,643 A 11/1996 Judson
5,675,510 A 10/1997 Coffey et al.
(Continued)

FOREIGN PATENT DOCUMENTS

CN 1378674 A 11/2002
JP 2002092475 3/2002
(Continued)

OTHER PUBLICATIONS

Tom Harris, "How Banner Ads Work", Feb. 1, 2001, computer.howstuffworks.com, "https://computer.howstuffworks.com/banner-ad.htm" (Year: 2001).*
(Continued)

*Primary Examiner* — Peter H Choi
*Assistant Examiner* — Jonathan J Whitaker
(74) *Attorney, Agent, or Firm* — Jones IP Group; Wayne A. Jones

(57) ABSTRACT

A system and method for creation, distribution and tracking of advertising via electronic networks, enabling creation of advertisements using licensed third party content and placement of said ads at desired network locations, utilizing an auction of ad spaces based on bids placed by advertisers to have their ads displayed at such locations. When a network user/ad viewer requests an ad by clicking or other action, an auction algorithm executes to select the ad to be displayed from those that bid for display at such ad space location and then the ad is composed and delivered to the ad space location by accessing a relational database storing commands that retrieve, assemble and dispatch the licensed ad content. Usage and display of licensed content on designated ad space is tracked to enable cost-per-use charging for both use of licensed content and ad display at the designated ad space.

42 Claims, 43 Drawing Sheets

Dispatcher Server 126    Ad Content File Server(s) 125

(52) U.S. Cl.
CPC ..... *G06Q 30/0254* (2013.01); *G06Q 30/0256* (2013.01); *G06Q 30/0261* (2013.01); *G06Q 30/0267* (2013.01); *G06Q 30/0269* (2013.01); *G06Q 30/0273* (2013.01); *G06Q 30/0275* (2013.01); *G06Q 30/0276* (2013.01); *G06Q 30/0277* (2013.01)

(58) Field of Classification Search
CPC ........... G06Q 30/0273; G06Q 30/0275; G06Q 30/0276; G06Q 30/0277
USPC .......................................................... 705/14
See application file for complete search history.

(56) References Cited

U.S. PATENT DOCUMENTS

| | | | |
|---|---|---|---|
| 5,708,780 A | 1/1998 | Levergood et al. | |
| 5,710,883 A | 1/1998 | Hong et al. | |
| 5,717,860 A | 2/1998 | Graber et al. | |
| 5,732,218 A | 3/1998 | Bland et al. | |
| 5,737,619 A | 4/1998 | Judson | |
| 5,740,549 A | 4/1998 | Reilly et al. | |
| 5,796,952 A | 8/1998 | Davis et al. | |
| 5,838,790 A | 11/1998 | McAuliffe et al. | |
| 5,848,396 A | 12/1998 | Gerace | |
| 5,937,390 A | 8/1999 | Hyodo | |
| 5,960,409 A | 9/1999 | Wexler | |
| 5,999,912 A | 12/1999 | Woodarz et al. | |
| 6,009,411 A * | 12/1999 | Kepecs ........................ 705/14 | |
| 6,011,537 A | 1/2000 | Slotznick | |
| 6,041,309 A * | 3/2000 | Laor ........................... 705/14 | |
| 6,081,829 A | 6/2000 | Sidania | |
| 6,108,637 A | 8/2000 | Blumenau | |
| 6,112,246 A | 8/2000 | Horbal et al. | |
| 6,115,680 A | 9/2000 | Coffee et al. | |
| 6,119,165 A | 9/2000 | Li et al. | |
| 6,138,115 A | 10/2000 | Agrawal et al. | |
| 6,141,010 A | 10/2000 | Hoyle | |
| 6,167,382 A * | 12/2000 | Sparks et al. .................... 705/26 | |
| 6,185,586 B1 | 2/2001 | Judson | |
| 6,205,432 B1 | 3/2001 | Gabbard et al. | |
| 6,243,865 B1 | 6/2001 | Wei et al. | |
| 6,268,856 B1 | 7/2001 | Timo et al. | |
| 6,269,361 B1 * | 7/2001 | Davis et al. ........................ 707/3 | |
| 6,275,854 B1 | 8/2001 | Himmel et al. | |
| 6,279,036 B1 | 8/2001 | Himmel et al. | |
| 6,310,601 B1 | 10/2001 | Moore et al. | |
| 6,314,451 B1 | 11/2001 | Landsman | |
| 6,317,761 B1 | 11/2001 | Landsman | |
| 6,317,782 B1 | 11/2001 | Himmel et al. | |
| 6,327,619 B1 | 12/2001 | Blumenau | |
| 6,347,398 B1 | 2/2002 | Parthasarathy et al. | |
| 6,393,407 B1 | 5/2002 | Middleton, III et al. | |
| 6,418,470 B2 | 7/2002 | Blumenau | |
| 6,449,634 B1 | 9/2002 | Capiel | |
| 6,466,967 B2 | 10/2002 | Landsman | |
| 6,516,338 B1 | 2/2003 | Landsman et al. | |
| 6,553,417 B1 | 4/2003 | Gampper | |
| 6,587,837 B1 | 7/2003 | Spagna et al. | |
| 6,643,696 B2 | 11/2003 | Davis et al. | |
| 6,654,539 B1 | 11/2003 | Duruoz et al. | |
| 6,657,647 B1 | 12/2003 | Bright | |
| 6,691,281 B1 | 2/2004 | Sorge et al. | |
| 6,693,649 B1 | 2/2004 | Lipscomb et al. | |
| 6,710,790 B1 | 3/2004 | Fagioli | |
| 6,728,753 B1 | 4/2004 | Parasnis et al. | |
| 6,763,386 B2 | 7/2004 | Davis et al. | |
| 6,789,108 B1 | 9/2004 | McMillan | |
| 6,791,579 B2 | 9/2004 | Markel | |
| 6,928,419 B2 * | 8/2005 | Stefik et al. ........................ 705/51 | |
| 6,990,630 B2 | 1/2006 | Landsman et al. | |
| 7,047,294 B2 | 5/2006 | Johnson et al. | |
| 7,120,590 B1 | 10/2006 | Eisen et al. | |
| 7,143,075 B1 | 11/2006 | Chickering et al. | |
| 7,146,401 B2 | 12/2006 | Hansell et al. | |
| 7,155,508 B2 | 12/2006 | Sankuratripati et al. | |
| 7,155,663 B2 | 12/2006 | Landsman et al. | |
| 7,310,609 B2 | 12/2007 | Middleton, III et al. | |
| 7,313,590 B2 | 12/2007 | Mentchoukov | |
| 7,376,907 B2 | 5/2008 | Santoro et al. | |
| 7,962,363 B2 | 6/2011 | Patel et al. | |
| 7,962,636 B2 * | 6/2011 | Stafie et al. ................... 709/229 | |
| 8,447,651 B1 * | 5/2013 | Scholl et al. ............... 705/14.54 | |
| 2001/0029585 A1 | 10/2001 | Simon et al. | |
| 2001/0037232 A1 | 11/2001 | Miller | |
| 2002/0002491 A1 | 1/2002 | Whitfield et al. | |
| 2002/0010631 A1 | 1/2002 | Sato et al. | |
| 2002/0016736 A1 | 2/2002 | Cannon et al. | |
| 2002/0063714 A1 | 5/2002 | Haas et al. | |
| 2002/0077891 A1 | 6/2002 | Castle et al. | |
| 2002/0099605 A1 * | 7/2002 | Weitzman ............... G06Q 30/02 705/14.35 | |
| 2002/0112005 A1 | 8/2002 | Namias | |
| 2002/0116494 A1 | 8/2002 | Kocol | |
| 2002/0120506 A1 * | 8/2002 | Hagen .................... G06Q 30/02 705/14.41 | |
| 2002/0120564 A1 | 8/2002 | Strietzel | |
| 2002/0124246 A1 | 9/2002 | Kaminsky et al. | |
| 2002/0141584 A1 * | 10/2002 | Razdan et al. ................. 380/203 | |
| 2002/0147634 A1 | 10/2002 | Jacoby et al. | |
| 2003/0004804 A1 | 1/2003 | Landsman et al. | |
| 2003/0005000 A1 | 1/2003 | Landsman et al. | |
| 2003/0023488 A1 | 1/2003 | Landsman et al. | |
| 2003/0023489 A1 * | 1/2003 | McGuire et al. ................. 705/14 | |
| 2003/0050833 A1 | 3/2003 | Hamzy | |
| 2003/0070182 A1 | 4/2003 | Pierre et al. | |
| 2003/0163372 A1 | 8/2003 | Kolsy | |
| 2003/0171985 A1 | 9/2003 | Prabhu et al. | |
| 2003/0200145 A1 | 10/2003 | Krassner et al. | |
| 2004/0030615 A1 | 2/2004 | Ling | |
| 2004/0039754 A1 | 2/2004 | Harple, Jr. | |
| 2004/0059683 A1 | 3/2004 | Epstein et al. | |
| 2004/0083133 A1 * | 4/2004 | Nicholas ................. G06Q 30/02 705/14.52 | |
| 2004/0103024 A1 | 5/2004 | Patel et al. | |
| 2004/0103426 A1 | 5/2004 | Ludvig et al. | |
| 2004/0117259 A1 | 6/2004 | Morrisoe et al. | |
| 2004/0143667 A1 | 7/2004 | Jerome | |
| 2004/0168184 A1 | 8/2004 | Steenkamp et al. | |
| 2004/0186778 A1 * | 9/2004 | Margiloff et al. .............. 705/14 | |
| 2004/0205651 A1 | 10/2004 | Dutta | |
| 2005/0021642 A1 | 1/2005 | Nonaka | |
| 2005/0033641 A1 * | 2/2005 | Jha ........................ G06Q 30/02 705/14.53 | |
| 2005/0038900 A1 | 2/2005 | Krassner et al. | |
| 2005/0039130 A1 | 2/2005 | Paul | |
| 2005/0055277 A1 | 3/2005 | Green et al. | |
| 2005/0091160 A1 | 4/2005 | Kitze et al. | |
| 2005/0091216 A1 | 4/2005 | Kranz et al. | |
| 2005/0108095 A1 | 5/2005 | Perlmutter | |
| 2005/0144073 A1 * | 6/2005 | Morrisroe ............... G06Q 30/02 705/14.5 | |
| 2005/0149396 A1 * | 7/2005 | Horowitz et al. ............... 705/14 | |
| 2005/0182677 A1 | 8/2005 | Hill | |
| 2005/0192871 A1 | 9/2005 | Galuten et al. | |
| 2005/0204309 A1 | 9/2005 | Szeto | |
| 2005/0240596 A1 * | 10/2005 | Worthen ............ G06Q 30/0257 | |
| 2005/0289475 A1 | 12/2005 | Martin et al. | |
| 2006/0136839 A1 | 6/2006 | Makela | |
| 2006/0174199 A1 | 8/2006 | Soltis et al. | |
| 2006/0224697 A1 | 10/2006 | Norris | |
| 2006/0248110 A1 * | 11/2006 | Lynn .................... G06Q 30/02 | |
| 2006/0277481 A1 | 12/2006 | Forstall et al. | |
| 2007/0033531 A1 * | 2/2007 | Marsh ........................ 715/738 | |
| 2007/0118640 A1 | 5/2007 | Subramanian | |
| 2007/0130602 A1 | 6/2007 | Gulli et al. | |
| 2007/0185763 A1 | 8/2007 | Miura et al. | |
| 2007/0265923 A1 | 11/2007 | Krassner et al. | |
| 2007/0282693 A1 | 12/2007 | Staib et al. | |
| 2008/0059571 A1 | 3/2008 | Khoo | |
| 2008/0086368 A1 | 4/2008 | Bauman et al. | |
| 2009/0265243 A1 | 10/2009 | Karassner et al. | |

(56) References Cited

U.S. PATENT DOCUMENTS

2010/0275221 A1 10/2010 Du Vali et al.
2011/0307329 A1 12/2011 Krassner et al.

FOREIGN PATENT DOCUMENTS

WO       WO 00/73960 A1    12/2000
WO       WO 2005081155      9/2005

OTHER PUBLICATIONS

James Shaw, "A complete banner advertising system", Jun. 10, 2002, www.developerfusion.com, "https://www.developerfusion.com/article/3753/a-complete-banner-advertising-system/" (Year: 2002).*
"Publishing Banner Advertisements", Feb. 19, 2005, www.build-a-website.net, "https://www.build-a-website.net/banner-publishing/" (Year: 2005).*
Grace, Jeremy, "Information and communication technologies and broad-based development a partial review of the evidence" World Bank, NetLibrary, Inc., Wash. D.C.
EPO, Communication, Reference No. DEP/57401EP1, Application No./U.S. Pat. No. 06847919.5-2221 / 1964046 PCT/US2006048805, 6 pages, dated Dec. 6, 2012.
State Intellectual Property Office of the People's Republic of China, "Notification of the Third Office Action," Dated Jan. 17, 2013, 2 pages, dated Jan. 17, 2013.
State Intellectual Property Office of the People's Republic of China, "Text Portion of the Notification of the Third Office Action," Dated Jan. 17, 2013, 2 pages, dated Jan. 17, 2013.
Kofman, Vlad, "Implementing Dynamic Scroll with Ajax, JavaScript, and XML," Developer.com, Jun. 6, 2007, pp. 1-6, (Internet publication).
Kofman, Vlad, "Imlementing Dynamic Scroll with Ajax, JavaScript, and XML," Developer.com, Jun. 6, 2007, pp. 1-5 (Internet publication).
Luu, Teri (IPEA/US), PCT International Preliminary Report on Patentability, PCT Applic. No. PCT/US06/48805, pp. 1-7, dated Jan. 20, 2011, Alexandria, Virginia.
Dunn, Tom (IPEA/US), PCT International Preliminary Report on Patentability, PCT Applic. No. PCT/US09/05733, pp. 1-16, dated Jan. 5, 2011, Alexandria, Virginia.
Li, Ying, Examiner's First Report on Patent Application No. 2006331610, pp. 1-2, dated Jan. 7, 2011, Australian Government-IP Australia, Australia.
Office Action Summary (final) for U.S. Appl. No. 12/384,403, filed Apr. 4, 2009 for Inventor: Brad Krassner; dated Sep. 3, 2013, dated Sep. 3, 2013.
Action Summary (non-final) for U.S. Appl. No, 12/384,403, filed Apr. 4, 2009 for Inventor: Brad Krassner; dated Oct. 17, 2011, dated Oct. 17, 2011.
Office Action Summary (non-final) for U.S. Appl. No. 11/803,779, filed May 16, 2007 for Inventor: Brad Krassner, dated Oct. 7, 2013.
Office Action Summary (final) for U.S. Appl. No. 11/803,779, filed May 16, 2007 for Inventor: Brad Krassner, dated Jul. 12, 2012.
Office Action Summary (non-final) for U.S. Appl. No. 11/803,779, filed May 16, 2007 for Inventor: Brad Krassner, dated Oct. 7, 2011.
Office Action Summary (final) for U.S. Appl. No. 11/803,779, filed May 16, 2007 for Inventor: Brad Krassner, dated Apr. 15, 2010.
Office Action Summary (non-final) for U.S. Appl. No. 11/803,779, filed May 16, 2007 for Inventor: Brad Krassner, dated Jul. 17, 2009.
Office Action: Summary (non-final) for U.S. Appl. No. 11/803,779, filed May 16, 2007 for Inventor: Brad Krasser, dated Nov. 6, 2008.
Office Action Summary (non-final) for U.S. Appl. No. 11/803,779, filed May 16, 2007 for Inventor: Brad Krassner, dated Jan. 10, 2008.
Request for Continued Examination w/amendments for U.S. Appl. No. 12/384,403, RCE filed Dec. 3, 2013, dated Dec. 3, 2013.
Response to Office Action for U.S. Appl. No. 12/384,403; Response filed Apr. 16, 2012, dated Apr. 16, 2012.
Request for Continued Examination w/amendments for U.S. Appl. No. 11/803,779, RCE filed Jan. 11, 2013, dated Jan. 11, 2013.
Response to Office Action for U.S. Appl. No. 11/803,779; Response filed Apr. 17, 2012, dated Apr. 17, 2012.
Response to Office Action for U.S. Appl. No. 11/803,779; Response filed Aug. 13, 2010, dated Aug. 13, 2010.
Response to Office Action for U.S. Appl. No. 11/803,779; Response filed Jan. 14, 2010, dated Jan. 14, 2010.
Response to Office Action for U.S. Appl. No. 11/803,779; Response filed Mar. 23, 2009, dated Mar. 23, 2009.
Response to non-final Office Action for U.S. Appl. No. 11/803,779; Response filed Jul. 9, 2008, dated Jul. 9, 2008.
Notification of the Sixth Office Action issued by the State Intellectual Property Office of the People's Republic of China for Application No. or Patent No. 200680049027.3 (English), dated Apr. 3, 2014.
Notification of the Sixth Office Action issued by the State Intellectual Property Office of the People's Republic of China for Application No. or Patent No. 200680049027.3 (Chinese), dated Apr. 3, 2014.
Patent Examination Report No. 1 issued by the Australian Government for Patent Application No. 2013200392, dated Apr. 28, 2014.
Rejection Decision issued by the State Intellectual Property Office of the People's Republic of China for Application No. or Patent No. 200680049027.3, dated Nov. 24, 2014.
USPTO Non-final Office Action, U.S. Appl. No. 11/803,779, filed May 16, 2007, Inventor: Brad Krassner et al., dated Jan. 10, 2008.
Response to Non-final Office Action, U.S. Appl. No. 11/803,779, Inventor: Brad Krassner et al., dated Feb. 7, 2014.
Request for Continued Examination for U.S. Appl. No. 11/803,779, filed May 16, 2007 for Inventors: Krassner et al., dated Sep. 22, 2014.
Notification of the Seventh Office Action issued by the State Intellectual Property Office of the People's Republic of China for Application No. or Patent No. 200680049027.3, dated Jul. 24, 2014.
Office Action of the European Patent Office—Germany re: Communication pursuant to Article 94(3) EPC; Application No. 06 847 919.5-1958, Ref. DEP/57401EP1, dated Oct. 16, 2015.
Office Action of the European Patent Office—Germany re: Summons to attend oral proceedings pursuant to Rule 115(1) EPC; Application No. 06847919.5-1958 / 1964046, Ref. DEP/57401EP1; received Apr. 19, 2017, dated Apr. 12, 2017.

* cited by examiner

FIG. 4
Dispatcher Database

| Record | Link to Rich media Ad | Link to Go-to Page | Link to Click Go-to page | Link to Click Go-to page | Custom Parameter | Custom Parameter |
|---|---|---|---|---|---|---|
| 2 | | | | | | |
| 3 | | | | | | |
| 4 | | | | | | |
| 5 | | | | | | |

Pay-Per-Use Ad Content Licensing Process Flow

Advertisement Spot Auction Process Flow

Figure 7

Sign In
Registered User

User ID:
Password:
Remember me: ☐

Sign In

> Forgot Password?

Register
New Free Account

After your registration is complete your unique User ID cannot be changed, so please make sure you enter a User ID that you can live with. Your User ID will also be in the web address of your personal depot (For example, if your user id is john33 your personal depot will be located at www.3cdepot.com/john33.) With a direct link to your own personal depot you can easily send relatives, friends and customers directly to your items in the 3Cdepot or even link your depot to your personal website.
Fields with (*) are required.

Login

User ID: *          Do not use spaces,
Password: *         punctuation, or
Confirm Password: * special characters
                    in either your User
                    ID or Password.

Name

First Name: *                    MI:
Last Name: *

Contact Information

Title:
Company:
Address: *
Address 2:
City: *
State *  -- Select State --

Figure 8

Sign In
Registered User

User ID:
Password:
Remember me: ☐

Sign In

» Forgot Password?

Register
New Free Account

After your registration is complete your unique User ID cannot be changed, so please make sure you enter a User ID that you can live with. Your User ID will also be in the web address of your personal depot (For example, if your user id is john33 your personal depot will be located at www.3cdepot.com/john33.) With a direct link to your own personal depot you can easily send relatives, friends and customers directly to your items in the 3Cdepot or even link your depot to your personal website. Fields with (✶) are required.

Login

User ID: ✶ [ ]  Do not use spaces,
Password: ✶ [ ]  punctuation, or
Confirm Password: ✶ [ ]  special characters
 in either your User
 ID or Password.

Name

First Name: ✶ [ ] MI: [ ]
Last Name: ✶ [ ]

Contact Information

Title: [ ]
Company: [ ]
Address: ✶ [ ]
Address 2: [ ]
City: ✶ [ ]
State ✶ [— Select State — ⌄]

FIG.9

Create New Ad    My Rich Media Ads

Guest Demo ○ Mon, Dec 18, 2006

Ad Title | Ad Category | Ad Click Destination | Ad Size | Creative Format | RM Library | Build Ad Ad Title Enter Title for your Ad and click Continue. The title is for your reference so you can find, track, update, or delete this ad later.

Title: * [My First Ad]

Select Creative File From Free Rich Media Library

Click on a thumbnail image to select a creative file. Click Preview to see the creative file.

FIND

1 › Preview
CLOCK AND CLOUD
COMPOSITE

3 › Preview
CROWD OF PEOPLE
WALKING

4 › Preview
FLOWERS BLOWING IN
BREEZE

2 › Preview
TIMELAPSE CLOUDS

Display 12 ▼ creative files per page.

[4 creative files] 1

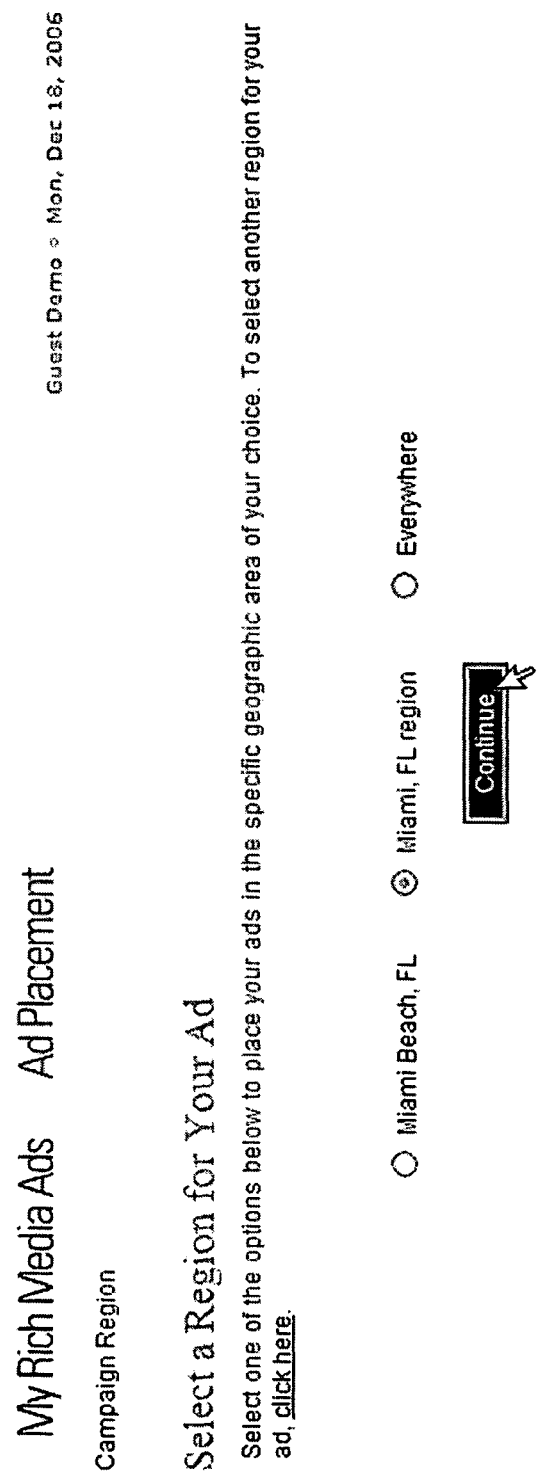

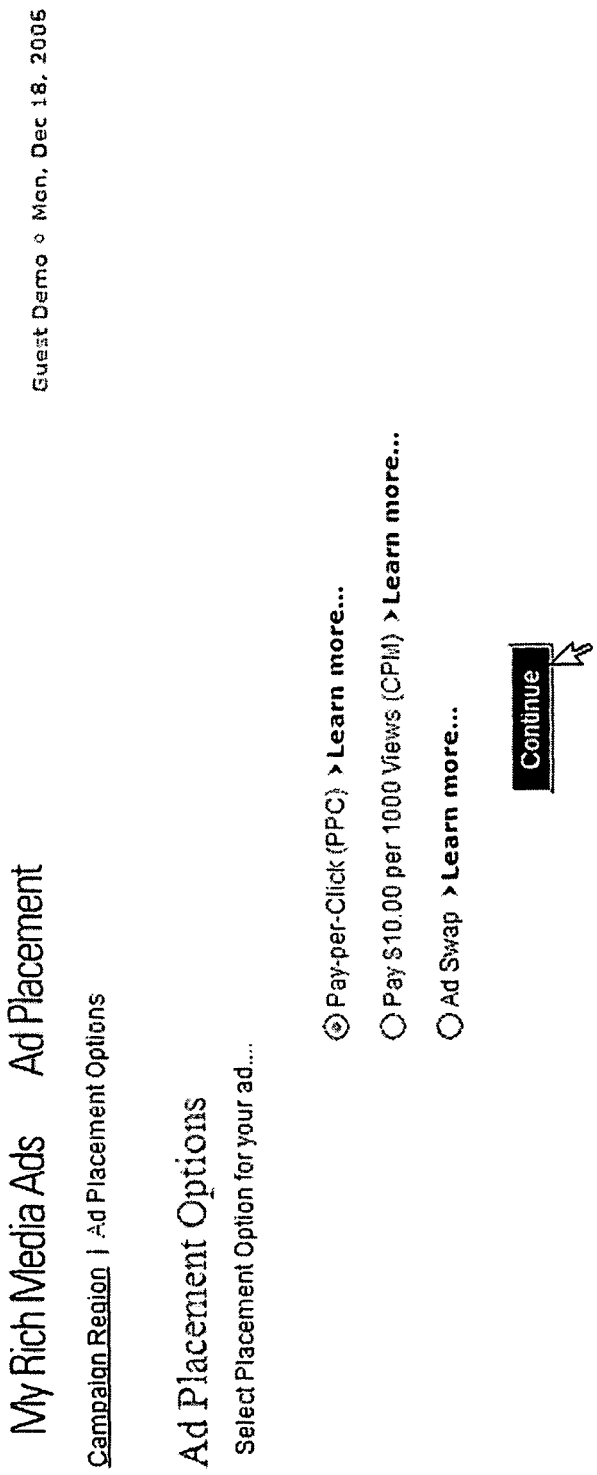

FIG. 17

Keywords and Maximum Bid Amount for Your Ad

Enter words or phrases in the fields below that you think others will use to look for your Product or Service. Feel free to use the words we've provided below, or change these words to the ones you prefer.

| Keywords | # of Ads Competing | Highest Bid | Best Click Through Rate | Your Ad Show Up % |
|---|---|---|---|---|
| Shoes | 0 | $0.00 | 0.00% | 100.00% |
| Boots | 0 | $0.00 | 0.00% | 100.00% |
| Sneakers | 0 | $0.00 | 0.00% | 100.00% |
|  | 0 | $0.00 | 0.00% | 0.00% |
|  | 0 | $0.00 | 0.00% | 0.00% |
|  | 0 | $0.00 | 0.00% | 0.00% |

If you place a bid that is more than required to win an ad placement and your ad will be clicked, you will only be charged $.01 higher than the next highest bid which protects you from ever bidding too much.

My Maximum Pay-Per-Click Bid: $ [ 0.10 ]  [Test My Bid]

Based on your bid this ad will show up in average 100.00% of the time when people use these keywords.

[Save]

FIG. 18

My Rich Media Ads    Ad Placement

Campaign Region | Ad Placement Options | Ad Placement Plan

Ad Placement Plan

Select the number of impressions/views you desire and the total budget for this ad campaign.

Number of Views: [2000 ▼]

Total Budget: $ [20.00]

[Check Out]

Guest Demo ○ Mon, Dec 18, 2006

FIG. 19

Select Target Categories

Select the categories that are relevant to the target market of your Ad. Imagine what people may be looking for that would be interested in your product or service.

- ○ Activity Partners
- ○ Antique
- ○ Art
- ○ Home & Garden
- ○ Baby & Children
- ○ Blogs
- ○ Boats
- ○ Books & Magazines
- ○ Business & Industrial Products
- ○ Business Services
- ○ Cameras & Photos
- ○ Cars & Passenger Vehicles
- ○ Cell Phones
- ○ Clothing, Shoes & Accessories
- ○ Coins
- ○ Collectibles
- ○ Community Calendar
- ○ Computers & Networking

- ○ Consumer Electronics
- ○ Crafts
- ○ Dolls & Bears
- ○ DVDs, Video & Movies
- ○ Education & Learning
- ○ Entertainment Memorabilia
- ○ Estate Sale
- ○ Food & Beverage
- ○ Garage Sale
- ○ General Community Info
- ○ General Items & Merchandise
- ○ Gift Certificates
- ○ Health & Beauty
- ○ Home & Garden
- ○ Information Products
- ○ Jewelry & Watches
- ○ Jobs, Employment & Resumes
- ○ Miscellaneous Vehicles

- ○ Motorcycles
- ○ Music
- ○ Musical Instruments
- ○ Personals
- ○ Pets
- ○ Pottery & Glass
- ○ Real Estate & Housing
- ○ Specialty Services
- ○ Sporting Goods
- ○ Sports Memorabelia & Fan Shop
- ○ Stamps
- ○ Ticket Events & Free Events
- ○ Toys & Hobbies
- ○ Trading Post
- ○ Travel and Leisure
- ○ Vehicle Parts & Accessories
- ○ Video Games
- ○ Wanted

FIG. 21

Provide Credit Information

The 3Cdepot will extend credit to you. Please enter your credit card information below to authorize your credit information and activate your ad(s).

PLEASE NOTE: You will not be charged in advance for your advertising. You are not required to deposit funds into an advertising escrow account. Your credit card will only be charged at the end of each 30 day period based on the actual performance of your Ad (s). There is a one-time, non-refundable, activation fee of $5.00 to begin using 3Cdepot ads.

Name (as it appears on card): * 555 5555 5555

Card Type: * Visa ▼

Card Number: *

Card Expiration: * 02 ▼ 2010 ▼

* ☑ I agree to the 3Cdepot Terms of Use

Submit

FIG. 22

Website publisher registers website and uploads website logo

My Websites  My Billboards  Create New Billboard

Guest Demo ◆ Mon, Dec 18, 2006

View Websites | New Website Registration

*Website Registration*

To place a Power-Billboard you must have at least one website registered. You may register as many websites or different hosts as you like. You may also register different areas within a website to organize your tracking information more efficiently. Uploading a website logo is not mandatory but is recommended if you are planning to place interstitial billboards (interstitial billboards run between web pages.) With interstitials, the website logo is displayed in the skip text of the advertisement. Logos must be in GIF JPG or PNG formats with a maximum size of 80 px by 800 px.

Website Name: ✱ [My Website]

Logo Image: [\\fs01\users\alane\My Pictures\3cdepo] [Browse...]

[Save]

FIG. 23

My Websites　My Billboards　Create New Billboard

Guest Demo @ Mon, Dec 18, 2006

Billboard ID

Power-Billboard ID

Enter an ID for your Power-Billboard and click Continue. The Billboard ID is for your reference so you can find, track or update this Power-Billboard later. (For adswap program you have to place Billboard on your site)

Billboard ID: * [Billboard 1]

Website: [My Website ▼]

[Continue]

Select Billboard 1 Power-Billboard Size

Select your desired Power-Billboard size by clicking on the appropriate image below..

FIG. 27

Billboard 1 Power-Billboard Targets

To optimize your revenue select one or more target categories to associate with your Power-Billboard by checking Set priority category, then selecting categories from the category list. Imagine what people that visit your website might be most interested in. Check Best Value Ads if you would like 3C depot/RMW Network technology to evaluate and deliver the best ads to display on your page. Select both if you would like 3C depot/RMW Network technology to select the best ads for your page in specific categories only. When you are done click Save and Get Code.

- ☐ Best Value Ads
- ☑ Set Category Priority

| | | |
|---|---|---|
| ☐ Activity Partners | ☐ Consumer Electronics | ☐ Motorcycles |
| ☐ Antique | ☑ Crafts | ☐ Music |
| ☐ Art | ☐ Dolls & Bears | ☐ Musical Instruments |
| ☑ Home & Garden | ☐ DVDs, Video & Movies | ☐ Personals |
| ☐ Baby & Children | ☐ Education & Learning | ☐ Pets |
| ☐ Blogs | ☐ Entertainment Memorabilia | ☐ Pottery & Glass |
| ☐ Boats | ☐ Estate Sale | ☑ Real Estate & Housing |
| ☐ Books & Magazines | ☐ Food & Beverage | ☐ Specialty Services |
| ☐ Business & Industrial Products | ☐ Garage Sale | ☐ Sporting Goods |
| ☐ Business Services | ☐ General Community Info | ☐ Sports Memorabelia & Fan Shop |
| ☐ Cameras & Photos | ☐ General Items & Merchandise | ☐ Stamps |
| ☐ Cars & Passenger Vehicles | ☐ Gift Certificates | ☐ Ticket Events & Free Events |
| ☑ Cell Phones | ☐ Health & Beauty | ☐ Toys & Hobbies |
| ☐ Clothing, Shoes & Accessories | ☐ Home & Garden | ☐ Trading Post |
| ☐ Coins | ☐ Information Products | ☐ Travel and Leisure |
| ☐ Collectibles | ☐ Jewelry & Watches | ☐ Vehicle Parts & Accessories |

FIG. 29

Enter Skip/Destination URL

Skip/Destination URL. This is the URL of the page you would like viewers to go to if they skip or watch the entire ad. It must be fully qualified absolute URL like "http://www.yourwebsite.com/destinationpage.html".
Skip Message: This message will be on the top of the interstitial screen.

Skip/Destination URL: * www.mywebsite.com/news

Skip Message: Please enjoy this message or Click Here to Skip... [x]

Save and Get Code

FIG. 30

Get Code for Billboard 1

Copy and paste the code below into the web page that you would like this Power-Billboard to be displayed in.

http://shop.3cdepot.com/billboard/?
id=24C4U4

Create New Power-Billboard | View My Billboards

FIG. 33

| | A | B | C | D | E | F | G | H | I |
|---|---|---|---|---|---|---|---|---|---|
| 1 | Unique ID | Template File | Name | Heading | Line 1 | Line 2 | Picture | Pric-CPC Bid | Keywords |
| 2 | 9291 | Path | DIRTECH MONGOOSE MASHER | Cherishing 24t 58mm BCD | WARRANTY | | Path | 231 | 0.09 Mountain bike, Bicycle |
| 3 | 9292 | Path | Gary Fisher Tassajara 19" | Custom Aluminum-Cream | Totally Like NEW | | Path | 789 | 1 Mountain bike, Bicycle, Game |
| 4 | 9293 | Path | Kbh 21-Speed Mountain Bike | Sam 9.0 Mountain Bike Grip | WARRANTY | | Path | 444 | 0.25 Mountain bike, Bicycle |
| 5 | 9294 | Path | SET OF 2 MOUNTAIN BIKE | 19" Silver and Blue | Totally Like NEW | | Path | 457 | 0.67 Mountain bike, Bicycle |
| 6 | 9295 | Path | Mountain Bike | Large Selection of Bikes | Click Here | | Path | | 1.9 Mountain bike, Bicycle |
| 7 | 9296 | Path | NEW MOUNTAIN BIKE | W/ROCKSHOX 24-Speed | WARRANTY | | Path | 367 | 1 Mountain bike, Bicycle |
| 8 | 9297 | Path | SCHWINN SIDEWINDER 2.6 | Mountain Bike not road bike | Click Here | | Path | | 0.45 Mountain bike, Bicycle |

FIG. 34

Click Daily Stats under the Ad Title to monitor that Ad's performance. Click an Ad title to edit the ad content, keywords, maximum bid and daily budget for the Ad. Click Advertising Budget Remaining to update your overall advertising budget. NOTE: Deactivated ads are Red colored.

find: [All ▼] [____] [Go] Advertising Budget Remaining: $800.00

Ads 1 to 10 of 10 · [20 ▼] per page ordered by: [Start Date ▼] [Descending ▼]

[10 postings] 1

| Title | Ad Type | Start Date ^ | End Date | Bid | Views # | Clicks # | ClickTru % | Spent $ | |
|---|---|---|---|---|---|---|---|---|---|
| test2 daily stats | Rich Media | Mon, Dec 18, 2006 | Wed, Dec 13, 2006 | $0.10 | 0 | 0 | 0% | $0.00 | ☐ |
| Lufthansa daily stats | Rich Media | Mon, Dec 18, 2006 | Wed, Dec 13, 2006 | $0.10 | 0 | 0 | 0% | $0.00 | ☐ |
| 2342 daily stats | Rich Media | Fri, Dec 15, 2006 | Wed, Dec 13, 2006 | $0.10 | 0 | 0 | 0% | $0.00 | ▶ |
| 1231 daily stats | Rich Media | Mon, Dec 11, 2006 | Wed, Dec 13, 2006 | $0.00 | 0 | 0 | 0% | $0.00 | ▶ |
| 1231 daily stats | Rich Media | Mon, Dec 11, 2006 | Wed, Dec 13, 2006 | $0.10 | 0 | 0 | 0% | $0.00 | ▶ |
| asdas daily stats | Rich Media | Sun, Dec 03, 2006 | Wed, Dec 13, 2006 | $0.05 | 10 | 0 | 0% | $0.00 | ▶ |
| 1231 daily stats | Rich Media | Thu, Nov 30, 2006 | Wed, Dec 13, 2006 | $0.00 | 0 | 0 | 0% | $0.00 | ▶ |
| adasd daily stats | Rich Media | Mon, Oct 09, 2006 | Thu, Nov 02, 2006 | $0.05 | 0 | 0 | 0% | $0.00 | ▶ |
| 2342 daily stats | 3Cdepot-Ad | Mon, Oct 09, 2006 | Wed, Jul 19, 2006 | $0.00 | 107 | 0 | 0% | $0.00 | ▶ |
| ad one daily stats | Rich Media | | | | | | | | ▶ |

FIG. 35

DORMONT 1BR beautiful ...

Instant-Ad Created:      Oct 9 2006 11:42AM
Total Number of Views during selected period:   0
Total Number of Clicks during selected period:   0
Average Clickthrough rate during selected period:   0.00%
Average Bid during selected period:   $0.00
Total Spent:   $0.00

From Date: 11 / 18 / 2006
To Date: 12 / 18 / 2006   Go

| Date | Views | Clicks | Click Throug % | Average Bid | Total Spent |
|---|---|---|---|---|---|
| Mon, Dec 18, 2006 | 0 | 0 | 0% | $0.00 | $0.00 |
| Sun, Dec 17, 2006 | 0 | 0 | 0% | $0.00 | $0.00 |
| Sat, Dec 16, 2006 | 0 | 0 | 0% | $0.00 | $0.00 |
| Fri, Dec 15, 2006 | 0 | 0 | 0% | $0.00 | $0.00 |
| Thu, Dec 14, 2006 | 0 | 0 | 0% | $0.00 | $0.00 |
| Wed, Dec 13, 2006 | 0 | 0 | 0% | $0.00 | $0.00 |
| Tue, Dec 12, 2006 | 0 | 0 | 0% | $0.00 | $0.00 |
| Mon, Dec 11, 2006 | 0 | 0 | 0% | $0.00 | $0.00 |
| Sun, Dec 10, 2006 | 0 | 0 | 0% | $0.00 | $0.00 |
| Sat, Dec 09, 2006 | 0 | 0 | 0% | $0.00 | $0.00 |
| Fri, Dec 08, 2006 | 0 | 0 | 0% | $0.00 | $0.00 |
| Thu, Dec 07, 2006 | 0 | 0 | 0% | $0.00 | $0.00 |
| Wed, Dec 06, 2006 | 0 | 0 | 0% | $0.00 | $0.00 |
| Tue, Dec 05, 2006 | 0 | 0 | 0% | $0.00 | $0.00 |
| Mon, Dec 04, 2006 | 0 | 0 | 0% | $0.00 | $0.00 |

FIG. 41

You are here: 🏠 Home > Dominics Desserts depot

Dominics Desserts depot

Merchant: Dominics Desserts
Member Since: Fri, Jun 30, 2006
Rating: ★★★★★ 9.9

Home | About Us | Contacts | Our Policies

[ Find in "Dominics Desserts depot" ]

Postings from 1 to 5 of 5 on 1 page

Power-Ads

Pittsburgh, PA

Food & Beverage
BRUNO'S BISCOTTI ... GLUTEN FREE AND CASEIN FREE
THE TRADITION: The biscotti were always kept in a large airtight tin squirreled away in the ...
$13.00
✂ Clip Wed, Nov 29, 2006 12:15 PM Eastern Pittsburgh, PA Food & Beverage
BRUNO'S BISCOTTI ... TRADITIONAL OR DAIRY FREE
Bruno's Biscotti: Authentic Italian Cookies
$10.00
✂ Clip Thu, Nov 30, 2006 2:55 PM Eastern GMC SONOMA 4X4 EXTENDED CAB (3DOOR) 5-SPEED (2002)
2002 GMC Sonoma 4X4 Extended Cab (3door) - 5-Speed - Well Maintained, Great Condition - V-5 ...
$10,500.00

GERMAN SHEPHERD PUPPIES
AKC - 100% WEST GERMAN LINES

RADIO CONTROL R/C SCION XB 1:6 SCALE W/ MP3RADIO
CONTROL R/C SCION XB 1:6 SCALE
RADIO CONTROL R/C SCION XB 1:6 Scale w/ MP3 SKU: scion-mn3

FIG. 43

You are here: 🏠 Home > Shopping Cart

Shopping Cart ??

Return to the 3Cdepot

You are purchasing from:
Merchant: Dominics Desserts
Member Since: Fri, Jun 30, 2006
Rating: ★★★★★ 9.9

1 Item in this Shopping Cart

| | | Item | Unit Price | Total |
|---|---|---|---|---|
| Qty | | | | |
| 1 | [image] | TULLIA'S TRUFFLES: GOURMET CHOCOLATES<br>Tullia's Truffles: We searched the world for the finest chocolate ... and found it. | $15.00 | $15.00 |
| | | | Sub Total: | $15.00 |
| | | | Total: | $15.00 |
| | | | Update Cart | Clear Cart |

Check Out

SYSTEM AND METHOD FOR CREATION, DISTRIBUTION AND TRACKING OF ADVERTISING VIA ELECTRONIC NETWORKS

PRIORITY CLAIMED BASED ON PRIOR U.S. APPLICATION

This Specification and Application is based on U.S. Provisional Patent Application Ser. No. 60/753,536 filed on Dec. 24, 2005, which is incorporated herein in its entirety by this reference. The benefit of Title 35, Section 119 of the U.S. Code is claimed based on said provisional application.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office Patent file or records, but otherwise reserves all copyright rights whatsoever.

BACKGROUND OF THE INVENTION

A. Technical Field

The present invention relates generally to methods and systems for creation and distribution of advertising, promotional and informational electronic communications regarding products and services via computer and communication networks, and displaying same at desired locations. More specifically, the present invention is a system and method for creation of electronic advertisements using digital content made available for licensing, and placing the ads at desired network locations utilizing an auction of designated advertising space at desired locations on a network.

B. Background

Advertisers seeking the global reach of the Internet and other electronic networks as an effective and efficient medium for disseminating advertisements to consumers have had to deal with various limitations in technology and methods. From the advertiser's perspective, there are two main tasks to accomplish: 1) creation of an effective ad; and 2) effective placement of the ad. From the ad publisher's perspective there are also two main tasks to accomplish: 1) display of the highest revenue-producing ads; and 2) reducing the amount of work necessary to place, maintain, track and process payments for advertising. The creation of electronic advertising content can be an expensive task for those that take the traditional route of either creating content internally or engaging a third party contractor to create same. While there are sources of pre-existing electronic content that can be used in exchange for payment of a fee, because of content provider system limitations in the ability to track usage activity with respect to the content, usually the fee is a flat fee payable up front, which makes the use of such content an expense that users must incur beforehand. This method does not allow for optimization of return on investment, or "ROI," with respect to ads based on real-time ad response, because if the advertising content is not working effectively, to change the content would mean losing all invested in the purchase of that content. This also can result in content licensors not maximizing the revenues generated from their content.

Effective placement of an ad is crucial for success of any ad campaign. The ad must reach the proper audience and as large an audience as possible in order to maximize the effectiveness of the ad in generating business for the advertiser. Ad display space costs money as well, and advertisers therefore need to make sure that the display locations they select for their ads produce an acceptable ROI to be worthwhile. In the case of the Internet, which is dominated by a large number of personal and special interest websites with relatively low traffic, a simple method for publishers to place advertising on their web sites for optimal return is necessary. Internet advertising charging methods include the pre-pay or billed cost-per-impression, or "CPM," or cost-per-click, or "CPC," models, wherein advertisers pay publishers to place their advertisements on a website according to the number of impressions served, or click actions taken on the advertisement. Usually these transactions are done through a third party agency who receives commissions based on a percentage agency discount offered by the publisher.

Methods currently in wide use for placing ads on electronic networks such as, for example, the Internet, are conceived primarily for the search engine business model, and work with an auction or bidding process to influence the position of a search listing within a search result list. Typically the advertiser pays a monetary amount every time action [such as a click] is taken on the listing. The auction can take into account a number of variables including cost-per-click, or "CPC" bid amount and the click-through rate of the advertisement. The advertiser sets up an account at the search engine, submits an ad for listing, enters keywords, and a cost-per-click monetary bid for placement of the ad. When the advertiser enters a bid amount the system then compares the bid amount with other bid amounts for the other ads that reference the same search term and generates a rank value for all search listings having the same search term. The rank value generated by the bidding process determines where the advertiser's listing will appear on the search results list page that is generated in response to a query of the search term by a searcher located at a client computer on the computer network. This system and method was effective in increasing the relevancy and "ROI" of contextual advertising by using corresponding search terms for the advertisement and the search listing, and offering a cost-per-click auction method so advertisers paid a desired amount only when their listing was clicked.

There remains a long felt need for publishers to easily and efficiently create and display advertising and for businesses to optimize their advertising expenses while increasing effectives of their advertising campaigns. Advertisers would benefit greatly if a system was available for them to easily and cost-efficiently procure quality digital content and create electronic ads using such content and then also direct, control and manage placement of the ads in all desired network locations all via one system, with all content usage and ad placement charges processed and paid for via one system. Advertisers would greatly benefit from a system that manages advertising costs by allowing them to use third party digital content on a cost-per-use basis and also pay for ad space for the ads created using such content in desired locations and in response to desired keywords on a cost-per-click basis, with payment from the advertiser to both the content licensor and the ad display location owner being processed each time the ad content is used by displaying the ad at the particular display location. They would further benefit from being able to manage their ad content composition and placement and make changes to their ad content and ad placement quickly and easily based on their assessment of ad and ad placement ROI or other effectiveness measures made possible by tracking data gathered by such a system. As discussed below, the present invention is such a system.

Previous methods only allow for simple text ads, or listings that link to web page. Larger rich media and professionally designed display ads are proven more effective at getting results, but in the past only available to companies with large budgets. Large professionally design display ads are more effective then text ads in getting response, but in the past where not easily distributed contextually. Placing large display ads on websites previously would be done by manually placing code in the publisher's web page, or in the web publishers ad distribution system, and if the ad was to be updated it had to be re-inserted. There needs to be one place where anyone who wants to advertise can create a rich media display ad and campaign parameters, and anyone with a website can place one piece of code in their webpage to display and track the advertising. If someone does not have an ecommerce website, there needs to be a simple way to upload products and prices, then connect their online "Store" to advertising they create.

The Applicants' efforts to address these needs have included the use of "File Server Direct Connection" technology, or "FSDC." FSDC is a method to establish a direct connection between a self-contained self-executing file and a custom network server-based application. FSDC preferably uses a .swf file or alternately an HTML or AJAX file which sends a query string directly to a specific URL for a desired network server, without loading variables from the file or requests to the history object of a user's network browser. The files include instruction coding that allows the file to establish a direct connection with one or more network servers, including servers storing content files that can then be run, and servers that when contacted track the access and use of the content files. By use of .swf files with commands coded within the file to establish connection with a tracking server, the tracking issue with cost per click/impression/sale electronic advertising schemes can be overcome. FSDC is described and claimed in the Applicants' pending U.S. non-provisional patent application entitled "Method and System For File Server Direct Connection," application Ser. No. 10/316,431 filed on Dec. 11, 2002 and published on Jun. 26, 2003 (Publication No. 20030120727), the specification and figures and all other parts of which are incorporated herein by reference. The coding of the .swf file establishes a connection to the tracking server so that a tabulation may be made, appropriately noting the response to the ad. As the communication to the tracking server is only made once the ad file has been opened, this is preferred over the prior art methodologies, which initiate the communication for tabulation prior to completing the link to the desired ad or site. In many cases, such tabulation is premature, as the user may close the window before the earlier desired material is delivered. The Applicants also have used FSDC in a system and method for creating and distributing customized rich media marketing and sales materials via email, which is described and claimed in the Applicant's co-pending U.S. patent application Ser. No. 10/417,478, filed on Apr. 17, 2003 and published on Oct. 23, 2003 (Publication No. US 2003-0200145-A1), as well as an Internet-based system and method for distributing interstitial advertisements, described and claimed in the Applicant's co-pending U.S. patent application Ser. No. 10/641,104 filed on Aug. 14, 2003 and published on Feb. 17, 2005 (Publication No. US 2005-0038900-A1), the specification and figures and all other parts of each of which are incorporated herein by reference. The system uses a relational database to execute dispatching commands to retrieve, assemble and dispatch ads for display and access destination pages based on ad viewer click action in response to the ad. The relational database used to execute dispatching commands and click action destinations also stores the command data required to execute the retrieval of selected digital content files previously stored in electronic format in one or more servers, messaging and billing for licensed digital media, enabling the viewer's browser to execute the assembly of the final whole advertising content.

The present invention builds upon the Applicants' basic FSDC rich media marketing material building and advertisement distribution platforms for electronic ad creation, distribution and tracking described in the above-referenced co-pending applications to provide a novel advertising electronic commerce system and method improving both efficiency and effectiveness for ad content licensors, advertisers and the publishers of the advertisements. Publishers and advertisers can benefit greatly from the present invention, which provides a "one stop shop" for electronic advertising on multiple networks" where everything necessary to effectively display, create, distribute, and track advertising is provided.

SUMMARY OF THE INVENTION

The present invention is a system and method for creating electronic advertisements using licensed digital content, and distributing such advertisements for display at desired network locations, including on multiple networks (such as, without limitation, computer networks such as the Internet as well as cellular, wireless, cable, satellite and other networks), whereby the ad to be displayed at a particular network location is selected from a group of ads that reference the same keyword or category and network location via an auction when the display location is acted upon by a network user/ad viewer. The digital content is delivered to designated advertising locations on the network and becomes part of an advertising display composed at the time requested by the network user/ad viewer by using a relational database for storing data required for commands that execute retrieval, assembly and dispatching of the licensed digital content files previously stored in one or more servers, as well as messaging, tracking, display, and billing for both use of the licensed content and display of the ad at the designated location on a cost-per-use basis. Third parties that make their digital content available for licensing and the publishers that display the advertisements on their network locations are automatically paid via the system each time an ad is displayed using their content and ad space, respectively. The system and method provides the ability for both publishers and advertisers to optimize the benefits of creating and distributing electronic advertisements, and manage and track every aspect of the advertisement creation and distribution process.

The present invention provides ad publishers with the ability to automatically accept placement of advertising at their network locations by providing a display space module, or "billboard module" that can be easily embedded at the network location where the ad will be displayed, such as, for example, on the ad publisher's web page(s) or, installed in cellular phone or a variety of other network devices that display advertising. This "billboard module" is associated with categories or keywords and communicates with a central dispatcher server that selects advertising and provides instructions to render the advertising in the module.

The present invention allows advertisers to create their own advertisements and license quality third party digital content for use in creating their advertisements (and also for content creators and providers to market their content) with payment for licensing of such third party content and ad distribution based on a cost-per-click, cost-per-impression or other pay-as-used scheme and with clicks/usage of the licensed ad content being accurately trackable. The advertisers can then associate topic keywords with the ads and include a bid for the display of the ad at desired network locations such as in specified areas of websites, search engines, portals or other network location display screens, in response to the "billboard module" being requested or otherwise acted upon. An advertiser can first create a custom advertisement using both content licensed from third parties made available for selection via the system, or use the advertiser's own content, with the instructions being stored in a database to execute and run the created advertisement at a desired location of a website, search engine or other network location when requested. The data stored in the database file for the ad with the rest of the ad execution instructions includes the cost-per-click, cost-per-impression or other charge rates for the licensed content used in the ad, which is the amount that the advertiser will be charged for using the licensed content each time the content is displayed to a user as part of the advertisement. The data stored in the database can also include the cost-per-click or other amount that the advertiser "bids" for display of the advertisement at certain locations on the website, search engine user search results screen, or other network location display screen when specified topic keywords are used as search queries. The system selects the advertisement to display in a designated ad space by conducting an auction based on the bids placed by the advertisers for display of their ad at the location. The auction is conducted immediately upon the request and initiation of the "billboard module" by a network user/ad viewer. If the advertisement is meant to display on a web page, the auction will begin when the web page containing the embedded billboard module is served. Like any page on the Internet, this page may be requested in a variety ways, including entering a URL address in a browser URL field, initiating a search by entering a specified search term in a search engine website, or clicking on the specified link, button or other symbol on any web advertising or content. In the case of search engines, the auctioned ad space is preferably space on the user query search results page other than in the actual search results list, which distinguishes the present invention's auction from those often used with respect to the preferred placement of advertiser listings in search results listings. In fact, present invention's method of auctioning ad space operates completely independently of any search engine query operation; the auction of ad space can be implemented with respect to any ad space, not just space on a search engine screen. Also, ads may be displayed after a search query that have no direct relationship to the search query keywords, making it possible for publishers to display second generation relevant ads. For example, when someone searches for bathing suits, an ad may appear for a diet product, because the ad module on the search result page contained "diet" as a topic keyword. The module may be placed in cell phones or physical electronic billboards presenting advertising as a result of auctions initiated at certain times of the day or when a phone is opened, or based on other customizable parameters. This also can prevent publishers from running advertisements of their competitors, which is something that is not doable under current keyword advertising systems.

The auction comparison can take into a account various customizable parameters to select the ad to be displayed at a designated location, including without limitation, topic keywords, categories, the advertisers' CPC/CPM bids and the ads' click-through, as well as the cost-per-click, cost-per-impression or other cost-per-use license fee for the licensed content comprising the ad.

The system's relational database, housed preferably in a dispatcher server, contains data files with the parameters and execution instructions for ads, and each ad parameter file has a unique identifier. The advertising space module or "billboard module," is preferably of the .swf format, [or .net, .asp, AJAX] and consists of code placed at the ad display location that triggers ad file selection auction and display of the selected ad when acted upon. The billboard module may be embedded as an object in a web page of a website, search engine or other network location, or used in a self-contained device, such as a cellular phone or other mobile device or electronic billboard. When requested or otherwise acted upon by the viewer, the billboard module communicates with the remote dispatcher server where the relational database is located. The relational database has all the information necessary to run the auction of available advertisements and then retrieve, assemble and present the advertising content of the auction winner to the viewer of the designated billboard module. The billboard module can contain instructions, including ad space size location and keywords associated with the ad space and may display more than one ad simultaneously or rotate different advertising in the same ad space. The keywords associated with the advertising space may be entered into the billboard module in a variety of ways, including manually by a webmaster, or dynamically, such as when a search engine user enters the keyword as a query, in which event the keyword is passed to the billboard module at the time of the search is executed.

The present system provides publishers with an account where they can enter information including their preferred method of receiving payment, address, and other relevant information. Publishers are also provided the opportunity to select ad size parameters, enter keywords or select categories to associate with their ad space. The system then generates the instructions and or the code necessary to embed a billboard module at the publisher's ad space. In the case of a website with search functionality, instructions will be generated on embedding the module so search query words are automatically passed to the module. The publisher is also given an interface to view metadata associated with the billboard modules activity, including clicks, impressions, and amount owed.

The present system provides advertisers with an account where they can enter instructions to select ad content from a variety of third party owned digital media and put together an electronic ad. Here they can also create customized advertising content and their advertising campaign by entering keywords to associate with the advertisement, the ad display locations desired and the CPC/CPM bid for display of the ad at such locations, regional targeting information or other parameters. Advertisers are also provided an account to deposit funds that is drawn upon based on their advertising activity. They are also provided an interface where they can view real-time metadata on the advertising campaign activity, including clicks, views, and amount paid.

The system is intended to be used by advertisers to create and place advertisements on third party websites, search engines and other network locations. The system's existence and operation is not apparent to end user/consumer who is the intended viewer of the advertisements. The system serves the advertisement files in addition to tracking impressions and click through rates in real time while the advertisement runs.

As noted previously, the present invention, in a preferred embodiment, uses FSDC technology to process ad viewer activity tracking data. This allows the system to send a tracking string with information (variables) received from the dispatcher server by the ad file directly to a tracking server. In a preferred embodiment, the tracking functions of the present invention are performed in a more efficient manner than prior art systems. Instead of redirecting a website user's request as discussed above, when a network user views an advertisement using the present invention and in response clicks or requests a URL or other location address from the information provided, the network user is taken directly to the URL or other location of interest, while a query string is independently sent to the system's tracking server from the ad file. The performance of the tracking server is not apparent to the network user and cannot affect the user. The tracking data is more accurate and can represent several different customizable parameters sent from the destination file viewed rather than merely counting the number of requests. Furthermore, the use of independent connection processes insures that the network user's system and privacy is not further exposed to the tracking service. Within the context of server side data sharing, the present invention provides fast and efficient, predominantly one-way communication, without requiring storage of any files on a network user's computer system. The system, by utilizing FSDC for tracking, directly establishes network connections between the ad file and the dispatcher server system where the tracking parameters and click-through destinations for advertisements are stored in the dispatcher server database by means of a single compiled file that does not require an additional network communications system such as a web browser or other supporting application. Specifically, a network connection is established to an encoded URL or other location address, and information is delivered to the tracking server in the form of a query string. Differing from a typical browser, or other typical network enabling software systems, the communication link established by the compiled file is predominantly one way and non-conversational. Impact on system resources is reduced as overhead support software is not required. Likewise bandwidth is conserved and issues of privacy are maintained as minimal information is exchanged without network user interaction or storage of files on the user's computer memory.

The present invention improves over prior advertising systems and methods in many ways. The present invention does not embed advertising HTML files within a web page, providing considerable economies to advertisers in saved labor, time and cost in terms of both inserting advertisements into web page files, and later changing any of those advertisements. The present invention functions totally transparently to a network user and which neither inconveniences nor burdens the user. The present invention does not require a network user to download or install on the user's computer a separate application program specifically to receive advertising or perform any affirmative act other than normal browsing to receive such advertising. The present invention also provides proper accounting to an advertiser, content licensor and ad publisher by accurately and validly ascertaining and tracking user click-throughs/impressions of fully rendered advertisements. The present invention also allows ad publishers to maximize the revenues an increase effectiveness they receive from running third party ads, by being able to select for display (via the auction) the most profitable ads due to cost-per-click and click-through rate statistics. The present invention allows advertisers to more accurately target their advertising on search engine websites by separating the advertising auction process from the search engine process, allowing for second generation relevancy. The present invention allows for optimization of advertising campaigns by allowing for real-time auctions for available advertising spots, taking into account the amount of available advertising spots at the time of the action, optimizing the value of the advertising spot at the time it is requested, and by allowing for the assembly of advertising on the fly for display on the network, and the ability to license quality digital media creative files on a cost effective cost-per-use basis, and update campaign parameter and creative according to campaign results derived in real time by FSDC tracking.

Additionally, for those advertisers that do not have an e-commerce website, the system allows them to create their own online e-commerce catalog and connect their product or catalog of products to their advertising. Users can then, when viewing the advertisement, access and review the product/catalog information and select items for purchase. The system provides the online e-commerce functionality to allow users to purchase and pay for the advertiser's products online, which is a valuable feature for those that do not have their own e-commerce capability, and provides a turnkey advertising and e-commerce system for users, providing them with the ability to create professional looking large display ads which are more effective in an easy and cost-efficient way.

BRIEF DESCRIPTION OF THE DRAWINGS

All of the figures depict preferred embodiments although other embodiments are contemplated and the present invention is not limited to the embodiments shown.

FIG. 4 depicts a sample system dispatcher server database parameter file.

FIG. 7 depicts a sample system user registration screen.

FIG. 8 depicts a sample system user log-in screen.

FIG. 9 depicts a sample advertisement creation input screen.

FIG. 12 depicts a sample system advertisement creative content catalog and selection screen.

FIG. 15 depicts a sample system geographic region designation screen.

FIG. 16 depicts a sample ad payment option selection screen.

FIG. 17 depicts a sample keyword and maximum bid data input screen.

FIG. 18 depicts a sample ad placement plan budget input screen.

FIG. 19 depicts a sample target category selection screen.

FIG. 21 depicts a sample ad payment data input screen.

FIG. 22 depicts a sample ad publisher website registration screen.

FIG. 23 depicts a sample ad publisher billboard identification screen.

FIG. 27 depicts a sample ad publisher billboard target category selection screen.

FIG. 29 depicts a sample skip/destination URL input screen, for use when billboard is created for an interstitial ad.

FIG. 30 depicts a sample interstitial ad/billboard URL copying screen.

FIG. 33 depicts a sample ad parameter data base listing showing multiple ad parameter files.

FIG. 34 depicts a sample ad campaign statistics screen with data regarding performance of ads and budget consumption.

FIG. 35 depicts a sample single ad statistics screen.

FIG. 41 depicts a sample system screen showing products posted by advertisers for sale via the system.

FIG. 43 shows a sample check-out and payment screen used in the e-commerce functionality provided to advertisers that do not have their own e-commerce capability.

Figure 1:
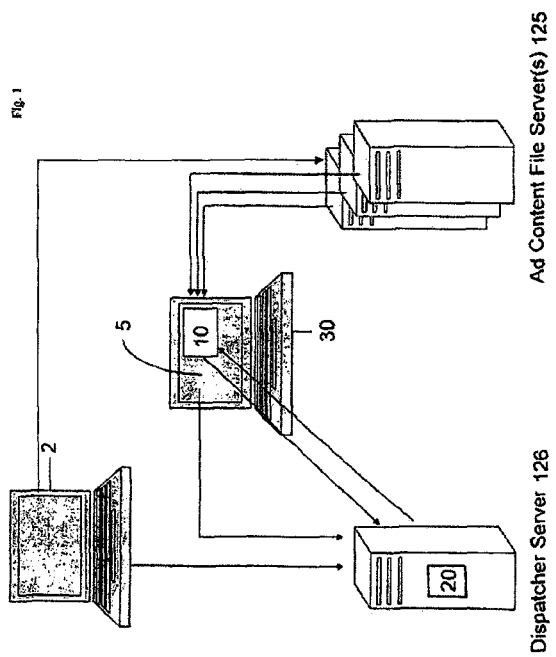
FIG. 1 is diagrammatical overview of the communication flow of the present invention.

DESCRIPTION OF A PREFERRED
EMBODIMENT OF THE INVENTION

According to a preferred embodiment hereof, the present invention is an all inclusive electronic advertising network system and method, including means for advertisers to create advertisements using licensed digital content on a cost-per-use basis, and means for distributing said advertisements via a "billboard module" and a dispatcher server automatically conducting an auction to select an ad for display whenever a billboard module on the network is requested by a network user/ad viewer. When the billboard module is requested at a network location it communicates with the relational database using the protocol appropriate for the particular network. At this time the auction takes place, first finding all of the ad parameter files in the database for the ads waiting for display that reference the same billboard module associated keywords or categories and other information passed from the billboard module, then using an algorithm to determine which ad (s) will ultimately be displayed in the ad space. Once the winning ad of the auction is determined, the ad is displayed within the designated billboard module according to the instructions in the relational database file for the ad. This file stores data required for commands that execute assembly, retrieval of selected digital media files previously stored in electronic format in one or more servers, as well as ad viewer tracking data, billing for licensed digital media and for display of the ad at the designated location, as well as where to direct the viewer of the ad, such as, in web implementations, to the desired destination website page relating to said advertisement, if the viewer desires to obtain more information regarding the advertisement, or to the next or previous designated web page or other network location. The relational database containing the ad placement parameters is stored in an ad dispatcher server which can be separate from the database and server providing the actual ad and digital media files.

The system of the present invention in a preferred embodiment comprises: a system-end computer equipped and configured for Internet or other network communications, including a dispatcher server including an ad parameter and command file database, and software applications to execute an auction to select an ad to be displayed at a particular network location; and also including computer processing means and one or more Internet or other network communications interface software applications for interfacing with system advertisers, providing a menu screen for advertisers to enter instructions for the creation of an ad, including messaging to be included in the ad, selection of an ad template, selection of digital content for the ad which may be licensed from third parties, and an area to enter instructions for an ad campaign, including selection of ad display locations, entry of cost-per-click bids for display of the ads and keywords or categories to be associated with the ad, and creating a data file in said dispatcher server database that contains parameters and commands to be used by the billboard module to provide access to said template advertisement file, licensed digital content, messaging, as well as the total cost-per-use of the licensed digital media files, the keywords/categories the ad will be associated, the network locations where the ad will be displayed and the advertiser's bid for display of the ad at the desired location; one or more content servers configured and equipped for Internet or other network communications communicating with said system-end dispatcher server and network user/ad viewer-end computer systems and having one or more digital content files stored thereon; an ad publisher interface including at the publisher end a computer configured and equipped for Internet or other network communications and also providing a menu screen for ad publishers to enter registration information, select categories or keywords to associate with their ad spaces and provide instructions to embed or install any number of "billboard modules" on their ad spaces, which billboard modules establish communications with the dispatcher server when an ad viewer acts on the billboard module, causing an auction to be executed for all advertisements in the dispatcher database with like parameters (e.g., the same keywords, categories and geographical region) and selecting one or more advertisements for display at the billboard module location based on the advertisers' bid for same, and then causing the selected ad to be displayed at the module by executing the instructions for the selected ad stored in the ad parameter/command file in the dispatcher server; and a network user/ad viewer-end computer configured and equipped for Internet or other network communications and communicating with said ad space location.

Additionally, for those advertisers that do not have an e-commerce website, the system allows them to create their own online e-commerce catalog and connect their product or catalog of products to their advertising. Users can then, when viewing the advertisement, access and review the product/catalog information and select items for purchase. The system provides the online e-commerce functionality to allow users to purchase and pay for the advertiser's products online, which is a valuable feature for those that do not have their own e-commerce capability, and provides a turnkey advertising and e-commerce system for users, providing them with the ability to create professional looking large display ads which are more effective in an easy and cost-efficient way.

As noted previously, the auction occurs when a billboard module is initiated anywhere on the network. The billboard module then establishes communication with the relational database containing information on all of the advertisements ready for display in the ad space on the network, then sends a request for advertising. This request includes a variety of information not limited to the keywords or categories associated with the advertising module and the size and dimensions of the available advertising space. The system runs a comparison, based on an algorithm, of all advertisements in the database with keywords that match the keywords associated with the advertising display location up for auction. This algorithm takes into account a variety of customizable parameters, including, without limitation the CPC/CPM bid on the advertisement and the click-through rate of the advertisement. The winning advertisement is then displayed in the advertising space. The advertisement displayed may also be assembled according to instructions in the same or other database. These instructions may call elements from a variety of locations, and assemble them for display within the advertising module. All actions taken on the advertising content are then sent back to the relational database using FSDC.

The billboard modules themselves are preferably .swf files, any comparable code such as .net .asp or AJAX that contains all the necessary code to send and retrieve data and variables from the dispatcher server. The module, when initiated, it establishes communication with the dispatcher with the appropriate network protocol, then the database runs applications required for the advertising auction. Based on the results of the auction, communication is sent back to the module with instructions on how to assemble and display the ad(s) where to retrieve the ad template file, files and digital media to present.

The ad template files themselves are preferably rich media files, preferably .swf, which is a Macromedia/Adobe Flash format any comparable code such as .net .asp, or AJAX that can be embedded to dynamic. This is a smart rich media file that can gather from and send information to a relational database and can retrieve and display an ad file from any server location. This ad file may be a static HTML image, or a rich media file such as .swf. The .swf file acts as a template file implements all of the necessary actions to retrieve a variety of data, including text messaging, digital media files including picture and rich media files including video, instructions on when to play or to be skipped, to track all custom parameters and to load a go-to page when it is a appropriate (for instance at the and of the ad or when it is skipped by user, or if an ad is clicked by a viewer). The template .swf file can be stored on any server connected to Internet. The digital media files are preferably stored at a content server or content database. The graphical user interface is stored preferably on the dispatcher server, and includes "thumbnails" or preview displays of the ad content files templates, digital media libraries with elements ready for licensing on a cost per use basis, and information regarding the location of the ad content files in order to easily identify and manage ads, but not necessarily the full ad file. It should be understood that the ad file and associated messaging and digital media files can be stored and accessed from any server. As the ad plays in the billboard module, tracking metadata is sent back to the dispatcher server enabling the billing of the advertiser, and payment to the ad publisher and owners of licensed digital content.

The interface means, processor means and computer communications means can have various embodiments, including, without limitation, use of traditional Internet browser applications, whether customized for use in the present system, or existing third party software applications to provide the advertisements to the user. In a preferred embodiment, the network location where the ad is desired contains an embed object command which activates the billboard module when the web page is requested or the location is otherwise acted upon. The billboard module is preferably an .swf file but may be an asp, .net or AJAX file, that establishes communication with the system-end dispatcher server. The billboard module file may reside in any server or other hardware connected to the network. When network users act upon a network location with an embedded billboard module, the billboard module loads in the viewer's browser and establishes communication with the dispatcher server. The module then transmits an identifier, and associated information such as keywords, categories, geographical location, ad size, etc, to the dispatcher server and the system auction software application conducts an auction to select the ad to be displayed from those that are associated with and have placed bids for display at the billboard module by comparing all advertisements in the database with like parameters and applying an algorithm that takes into account a number of variables such as, without limitation, cost-per-use bid, click-through rate and then retrieves the selected ad parameter/command file from the database and then communicates the location of the selected advertising or advertising template file. The dispatcher then passes all necessary information from the database into the advertisement template file. The advertisement is then rendered in the template file, within the ad billboard module, according to the instructions in the ad parameter/command file in the dispatcher server database. Instructions may include, but are not limited to, text messaging, location of licensed digital media content; go-to locations (upon click action by viewer) and other tracking information. That information can be passed to the advertising template via a data string that loads the ad and then some of the information can be used as part of the tracking string sent from the ad file.

When the ad files are retrieved and run, metadata is sent to the dispatcher server using FSDC and the system calculates and charges the specified cost-per-use of the display of the ad at the desired location, and of the licensed content, drawing funds from the advertiser's system account to pay the content licensor and ad space location owner.

Referring to FIG. 1, which depicts a diagrammatical overview of the communication flow of the present invention, without reference to any particular type of network, there is an ad publisher with ad space made available for ad placement 5 which communicates with the system-end dispatcher server 126 to create the ad publisher's system account, enter the keywords or categories that the ad publisher wants associated with the ad publisher's ad space, and receive from the dispatcher server 126 the software code comprising the billboard module 10 to be embedded at the ad publisher's ad space 5. In FIG. 1, the billboard module 10 is depicted on the ad publisher's ad space 5 represented by the screen on the computer icon, and the computer 30 is a network user/ad viewer-end device. Advertiser computer 2 communicates with the dispatcher server 126 to license content to create an ad and enter the parameters and commands to retrieve the content files, assemble them into the overall ad, preview and display the ad at the designated ad space 5, also including the keywords to be associated with the ad, possibly geographical, timing, or other parameters as to display of the ad, the location of the ad space 5 where the ad will be displayed, and a bid for display of the ad at the ad space 5 when an ad viewer acts upon the billboard module 10 and the ad is the one selected in the auction that automatically ensues at the dispatcher server 126 when the billboard module 10 is activated. The advertiser's ad parameters and commands and bid display are stored as a file in the ad parameter and command file database 20 within the dispatcher server 126. When an ad viewer requests or otherwise acts upon the location where the billboard module 10 is embedded, the billboard module 10 communicates with the dispatcher server 126 and ad parameter and command file database 20 and the relevant keywords and other information relating to the ad space 5 is provided from the billboard module 10 which are used by the system software applications to conduct an auction to select an ad for display from those that have the corresponding keywords and other parameters based on the bids placed with respect to such ads for display. Once the auction is conducted and an ad is selected, the corresponding ad parameter and command file for the ad in the ad parameter and command file database 20 is activated to retrieve the ad content files comprising the ad from the ad content file server(s) 125, assemble and display the ad at the ad space 5. Meta data relating to the ad is sent back to the dispatcher server 126 for tracking and also charging for use of the licensed content and display of the ad at the ad space 5. The advertiser's account is debited and the content licensors and ad publishers are paid.

Figure 5:
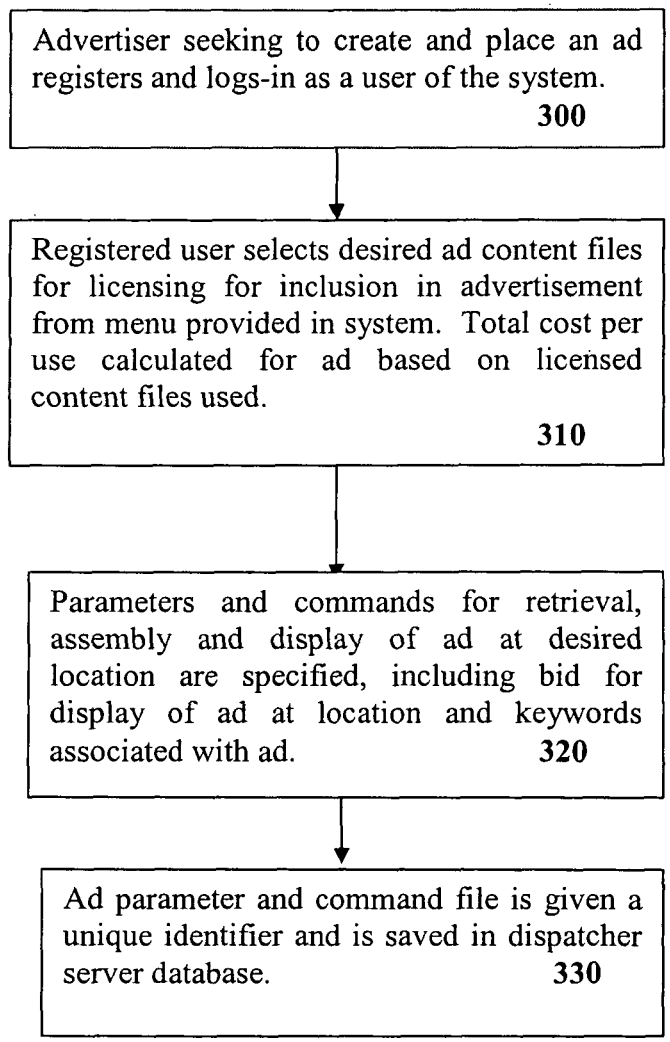
FIG. 5 is a flow chart depicting the pay-per-use content licensing process flow.

The system is preferably made available to website operators and advertisers via a system website for use by them after registering as a website advertisement administrator. Referring to FIG. 5, which shows the process flow of the advertising method implemented with the system of the present invention via the Internet, an advertiser creates and places an ad by executing the following steps:

Registering with the system as an advertisement administrator 300, 310 advertisers are directed to a menu where they create their advertising display by entering messaging, uploading logos or pictures, selecting from a variety of digital content libraries made available through the system for licensing on a cost-per-use basis, and create an advertising campaign by entering keywords or selecting categories to associate with said advertisement, network location and geographical region for the advertisement's display, go-to location upon click action on the advertisement, cost-per-use bid, minimum daily budget and other ad parameter data. Advertisers are also provided the opportunity to run real-time test auctions to evaluate approximate results of their campaign with the parameters they have selected. These items of information are then stored as the unique record in the database that can be retrieved and used by the billboard module and advertisement template file (.swf .asp, .php, .net, AJAX or other file format) parameter command file for that particular ad placement 330. The record also includes the cost-per-use data for all of the ad content files forming part of the ad, and also the "bid" for display of the ad at specified network locations in response to user queries on search engines and/or websites using specified words or other user action at the specified network location where the ad is to be displayed.

After clicking "Save" in the system user screen when the above-referenced data is entered, a unique specific database record containing the specified custom parameters in the system's dispatcher server. When a billboard module on the network is requested, a communication is established with the dispatcher server, and after comparison, one or more of these specific database records are requested and the advertising is displayed/placed in the module. This placement can be "bid" on by multiple advertiser's that seek to have their ads displayed in such locations, and the system's auction function allows the website operator/ad displayer to display the ads that are most profitable for it to display, i.e., those that generate the most advertising revenue. This relational database entry also may contain custom parameters which, with the help of the FSDC tracking system, will pass tracking data relating to impressions and any actions (clicks on multiple parameters) taken on that particular advertisement for tracking and compilation for the website operator/advertiser's future reference. The present invention makes serving ads possible without any pre-loading technology required.

Registering with the system as a publisher administrator, publishers are directed to a menu where they enter information including contact information, and account information as to where they would like payments for advertising made to. They are also offered a menu to select preferred ad space sizes and dimensions, and enter keywords to associate with the ad space (billboard module) or select from a list of categories to associate with the billboard module. Upon submission the code necessary to embed the module in a web page is generated, with instructions. In the case of a website with search functionality, instructions will also be given on dynamically associated keyword requests with the advertising module.

Figure 2:
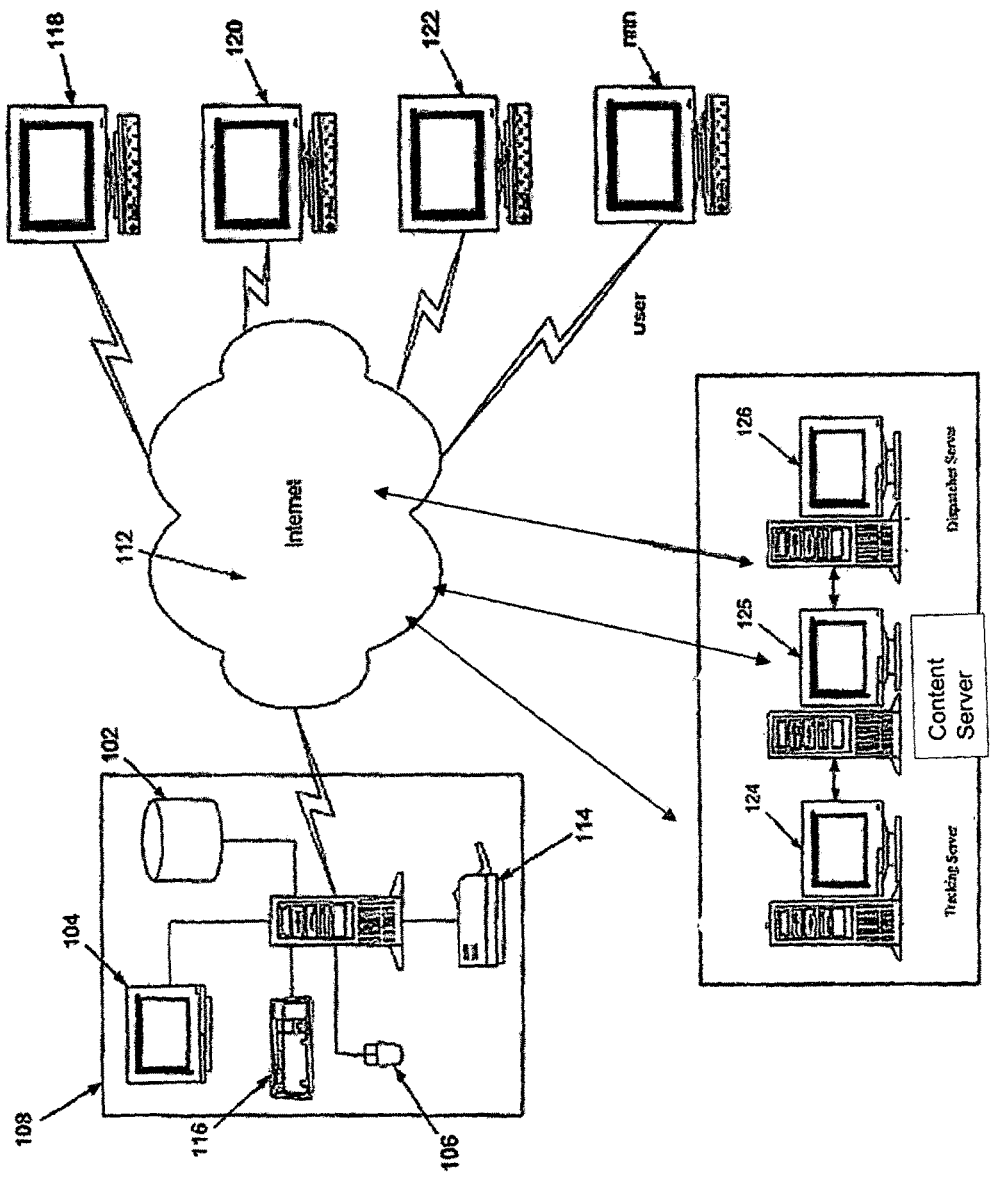
FIG. 2 is a diagrammatical representation of system components and their interrelationship.
Figure 3:
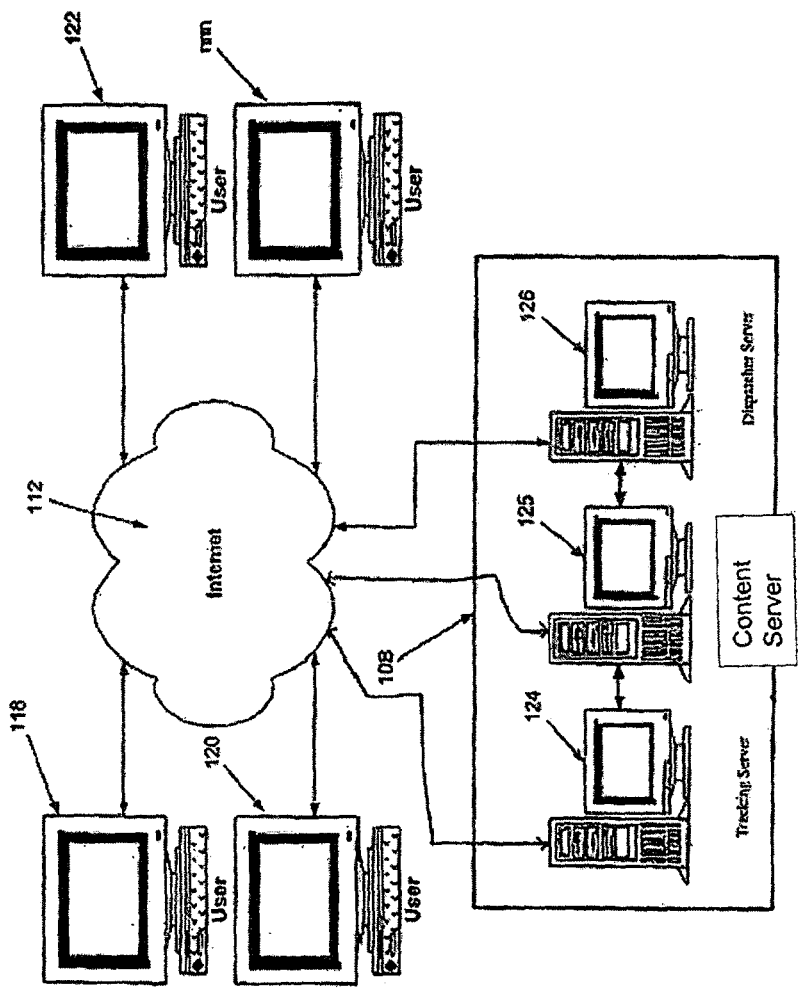
FIG. 3 is a diagrammatical overview of the relationship among system servers and website users utilizing the system of the present invention.

Referring now to FIGS. 2 and 3, an overview of a preferred embodiment of the present invention is shown. The present invention includes a system website viewer and operator/advertiser computer system 108. The ad creator can publish his own ads on his own site or publish on other sites having billboards made available by others. The computer system 108 comprises input and output devices, as is well-known in the art. For example, the computer system 108 preferably comprises a display screen or monitor 104, a keyboard 116, a printer 114, a mouse 106, etc. The computer system 108 is preferably connected to the Internet 112 that serves as one preferred communications medium. The Internet 112, as previously discussed, comprises a global network of networks and computers, public and private. The Internet 112 is the preferable connection method by system users 118, 120, 122 and nnn in preferred embodiments of the present invention. The website user/advertisement viewer's computer is preferably similar in its features.

Referring now to FIG. 3, the system-end computer 108 is shown. The computer system 108, in a preferred embodiment, comprises an ad dispatcher server 126, a tracking server 124 (which can be the same as or part of the dispatcher server), one or more licensed digital content file servers 125. The dispatcher server 126, licensed digital content file servers 125 and tracking server 124 preferably run in a variety of operating system environments, including MS Windows NT, MS Windows 2000, Linux and others, and preferably utilize a variety of database management systems, including MS SQL Server, Oracle and others.

Connectivity between the system user-end, the system-end and ad viewer-end may be effected in various forms without violating the scope and spirit of the present invention. In particular, network connectivity may be made by a telephone line/modem combination as is well known in the art, a dedicated ISDN line or a cable modem-type set-top-box which provides for Internet connectivity through certain forms of cable television services. Wireless communication can also be utilized. In each of the aforementioned cases, the computer of the website user-end portion will need to be provided with a suitable I/O card, such as a modem, ISDN card, and the like, in order to effect an appropriate interface with the network connection.

In application, the system provides for placement and delivery of advertisements as a compiled file. Preferably, this compiled file is a flash file identified by the .SWF suffix other files can be used. The use of the Macromedia/Adobe Flash file is preferred because of the ability to provide instructional code within the .swf file, and because nearly all customer computer systems have been enabled with the Flash player as a result of normal Internet browser configuration. Also, .swf files have become more universal, and able to execute in a variety of devices, including cell phones, PDA's, television and other devices. It is to be understood that under the teachings of the present invention, any type of file that is capable of operation without the initiation of an additional application could be used in place of Flash and the .swf file and use of a .swf file is not a limitation of the present invention.

Under the present invention, the clicking of the ad link or entry of the specified keyword as a search query, or other ad viewer action at the billboard module placed at the display location activates the corresponding ad parameter/command file in the ad parameter file database at the dispatcher server. Sample billboard module code is provided below:

```
KeyFrame # 1
_root.stop( );
// Get Objects for Template
sendForObjects = new LoadVars( );
receiveObjects = new LoadVars( );
// event handler to kickoff
_root.onLoad = function( ) {
// the sendForObjs keywords for ad auction and receive variable that are used for ad population
    sendForObjects.sendForObjs = "flashPort";
    sendForObjects.sendAndLoad("http://www.3cdepot.com/adAuction/getAds.asp?keywords="+q+"&nocache="+new Date( ).getTime( ), receiveObjects, "POST");
    // used in below function to check if our receiveObjects object has loaded
    receiveObjects.onLoad = receiveObjectsLoaded;
};
```

```
// if object data received, send to next frame
function receiveObjectsLoaded(success) {
    if (success) {
        // destroy the objects
        delete receiveObjects( );
        delete sendForObjects( );
        _root.nextFrame( );
    } else {
        (_root.errorMsg.text="Error Accessing Database");
    }
}
KeyFrame #2
//create variables to store ads's clientUID and userUID
catClientUID = receiveObjects.catClientUID;
catUserUID = receiveObjects.catUserUID;
catalogName = receiveObjects.catalogName;
//create array to store Ad Optional Attributes
catArray = receiveObjects.catAttribsList.split('|');
for (n=0; n<catArray.length; n++) {
    d = catArray[n].split('#');
    item = {AdTitle:d[0], AdHeight:d[1], AdWidth:d[2], image_src:d[3], url:d[4], message:d[5], subTitle:d[6], bgColor:d[7], textColor:d[8], sound:d[9]};
    catArray[n] = item;
}
//remove last object from array since its undefined
catArray.pop( );
//initialize catalog attribute variables from array
AdTitle = _level0.catArray[0]["AdTitle"];
bgColor = _level0.catArray[0]["bgColor"];
AdHeight = _level0.catArray[0]["AdHeight"];
AdWidth = _level0.catArray[0]["AdWidth"];
url = _level0.catArray[0]["url"];
textColor = _level0.catArray[0]["textColor"];
inseam = _level0.catArray[0]["inseam"];
image_src = _level0.catArray[0]["image_src"];
subTitle = _level0.catArray[0]["subTitle"];
sound1 = _level0.catArray[0]["sound"];
/*--------------------------------------------------*/
//create array to store item and its properties
itemPropArray = receiveObjects.itemObjsList.split('|');
for (n=0; n<itemPropArray.length; n++) {
    d = itemPropArray[n].split('#');
    item = {auctionUID:d[0], adUID:d[1], order_num:d[2], adName:d[3], img:d[4], clientUID:d[5], userUID:d[6], title:d[7], caption:d[8]};
    itemPropArray[n] = item;
}
//remove last object from array since its undefined
itemPropArray.pop( );
//sort array by order_num
itemPropArray = itemPropArray.sortOn("order_num");
nextFrame( );
Keyframe # 3
_root.stop;
// create array to store to be duplicated clip names
clipNames = new Array( );
//function which loops through array and generate a duplicatemovie statement for each item in array
//numItems accepts number up to max items in catalog
//imageDir points to folder structure where images are stored (either "", "1", or "1/2")
//clipToDuplicate is the name of the parent movieclip to duplicate
//imageHolderPath is the dot notation target path to the imageHolder mc function
createItems(numItems,imageDir,clipToDuplicate,imageHolderPath,imageSpacing) {
//for (var h = 0; h<itemPropArray.length; h++) {
for (var h = 0; h<numItems; h++) {
    //get the adUID from array to be used for duplicate movieclip name
    itemObjUID = itemPropArray[h]["itemUID"];
    //get the adName from array to be used in textfield
    itemThumbNail = itemPropArray[h]["thumbNails"];
    //get the title from array
    itemTitle = itemPropArray[h]["title"];
    itemCaption = itemPropArray[h]["caption"];
    //get the clientUID and userUID to be used in path to image
    clientUID = itemPropArray[h]["clientUID"];
```

```
        userUID = itemPropArray[h]["userUID"];
        //duplicate the movieclip
        randomNum = random(1000);
        _root[clipToDuplicate].duplicateMovieClip(itemObjUID,
randomNum);
        //store newly duplicated clipnames in array
        clipNames.push(itemObjUID);
        //set the textfields with title and caption
        set(itemObjUID + imageHolderPath + ".textF.text",
String(itemTitle));
        set(itemObjUID + imageHolderPath + ".captionF.text",
String(itemCaption));
        //set background color of caption textBox
        set(itemObjUID + imageHolderPath +
".captionF.backgroundColor", "0x5A6B73");
        set(itemObjUID + imageHolderPath + ".captionF.borderColor",
"0xCCCCCC");
        //position movie clips
            if (h<1) {
                var xpos = 5;
                setProperty(itemObjUID, _x, xpos);
            }
            else {
                xpos = xpos + imageSpacing;
                setProperty(itemObjUID, _x, xpos);
            }
            //load thumbnails
        loadMovie("http://www.3cdepot.com/ads/images/"+clientUID+"/"+
userUID+"/"+imageDir+"/"+itemThumbNail, itemObjUID +
imageHolderPath + ".imageHolder");
            }
    }
//store the number of items from array to be duplicated
arrLength = itemPropArray.length;
play( );
KeyFrame # 4
_root.stop;
// create array to store to be duplicated clip names
thumbClipNames = new Array( );
//function which loops through array and generate a duplicatemovie
statement for each item in array
//numItems accepts number up to max items in catalog
//imageDir points to folder structure where images are stored (either "",
"1", or "½")
//clipToDuplicate is the name of the parent movieclip to duplicate
//imageHolderPath is the dot notation target path to the imageHolder mc
function
createThumbs(numItems,imageDir,clipToDuplicate,imageHolderPath,
image Spacing) {
        //for (var h = 0; h<itemPropArray.length; h++) {
        for (var i = 0; i<numItems; i++) {
            //get the adUID from array to be used for duplicate
movieclip name
            th_itemObjUID = itemPropArray[i]["itemUID"];
            //give special movieclip name designation to thumbnails
            th_itemObjUID = th_itemObjUID + "th"
            //get the adName from array to be used in textfield
            th_itemThumbNail = itemPropArray[i]["thumbNails"];
            //get the clientUID and userUID to be used in path to
image
            th_clientUID = itemPropArray[i]["clientUID"];
            th_userUID = itemPropArray[i]["userUID"];
            //duplicate the movieclip
            th_randomNum = random(10000);
        _root[clipToDuplicate].duplicateMovieClip(th_itemObjUID,
th_randomNum);
            //store newly duplicated clipnames in array
            thumbClipNames.push(th_itemObjUID);
            //position movie clips
                if (i<1) {
                    var th_ypos = 400;
                    setProperty(th_itemObjUID, _y, th_ypos);
                }
                else {
                    th_ypos = th_ypos + imageSpacing;
                    setProperty(th_itemObjUID, _y, th_ypos);
                }
//load thumbnails
loadMovie("http://www.3cdepot.com/ads/images/"+th_clientUID+"/
"+th_user
UID+"/"+th_itemThumbNail, th_itemObjUID + imageHolderPath +
".imageHolderSm");
        }
}
//store the amount of items from array to be duplicated
thumbArrLength = itemPropArray.length;
//function that places thumbnail clips at specified x and y points
function placeThumbs(clipNum,x,y) {
    setProperty(thumbClipNames[clipNum], _x, x);
  setProperty(thumbClipNames[clipNum], _y, y);
}
play( );
KeyFrame # 5
//Send tracking parameters
if (_level0.x != null && _level0.x != "") {
    loadVariablesNum("http://www.3cdepot.com/ads/
counter/?x="+_level 0.x+"&t="+_level0.catalogName+"&c=
"+_level0.c+"&p="+_level0.p, 0);
    }
KeyFrame # 6
//call the functions to create ads
createItems(arrLength,"1","itemHolderLg","", 180);
createThumbs(thumbArrLength,"","itemHolderSm","",60);
placeThumbs(0,353,150);
```

A sample of code that is embedded in the ad publisher's ad space on a website is provided below:

```
<%@LANGUAGE="VBSCRIPT" CODEPAGE="1252"%>
<!DOCTYPE html PUBLIC "-//W3C//DTD XHTML 1.0
Transitional//EN" "http://www.w3.org/TR/xhtml1/DTD/xhtml1-
transitional.dtd">
<html xmlns="http://www.w3.org/1999/xhtml">
<head>
<meta http-equiv="Content-Type" content="text/html;
charset=iso-8859-1"/>
<title>Ad Module</title>
</head>
<body>
<object classid="clsid:D27CDB6E-AE6D-11cf-96B8-
444553540000"
codebase="http://download.macromedia.com/pub/shockwave/cabs/
flash/swflash.cab#version=7,0,19,0" width="260" height="400"
title="Ad_module_1">
    <param name="movie"
value="http://www.3cdepot.com/ads/module_1.swf?keywords=<%
= Request.QueryString("q") %>"/>
    <param name="quality" value="high"/>
    <embed
src="http://www.3cdepot.com/ads/module_1.swf?keywords=<%=
Request.QueryString("q") %>" quality="high"
pluginspage="http://www.macromedia.com/go/getflashplayer"
type="application/x-shockwave-flash" width="260"
height="400"></embed>
</object>
</body>
</html>
</html>
```

A sample of code embedded in a search engine ad publisher's ad space is provided below:

```
<!DOCTYPE html PUBLIC "-//W3C//DTD XHTML 1.0
Transitional//EN" "http://www.w3.org/TR/xhtml1/DTD/xhtml1-
transitional.dtd">
<html xmlns="http://www.w3.org/1999/xhtml">
<head>
<meta http-equiv="Content-Type" content="text/html;
charset=iso-8859-1"/>
<title>Ad Module</title>
</head>
<body>
<object classid="clsid:D27CDB6E-AE6D-11cf-96B8-
```

```
444553540000"
codebase="http://download.macromedia.com/pub/shockwave/cabs/
flash/swflash.cab#version=7,0,19,0" width="260" height="400"
title="Ad_module_1">
   <param name="movie"
value="http://www.3cdepot.com/ads/module_1.swf"/>
   <param name="quality" value="high"/>
   <embed src="http://www.3cdepot.com/ads/module_1.swf"
quality="high"
pluginspage="http://www.macromedia.com/go/getflashplayer"
type="application/x-shockwave-flash" width="260"
height="400"></embed>
```

```
         </object>
      </body>
</html>
```

As directed by the billboard module, the dispatcher server conducts an auction to select the ad to be displayed from those that have bid for display with reference to the particular keyword(s) or topic and then retrieves the selected ad's ad parameter/command file from the dispatcher server (.swf file or HTML, asap, net, or AJAX file in which .swf file is embedded). Sample ad auction algorithm code is provided below:

```
CREATE PROCEDURE dbo.ab_AdAuction
(@keywords nvarchar(50), @blockSize INT, @area tinyint, @cityUID INT,
@stateCode varchar(2), @dup_postingUID INT)
 AS
SET NOCOUNT ON
BEGIN
DECLARE @areaStr varchar(200), @postingSrt varchar(200), @rq
varchar(8000), @li INT, @total_ratinginBlock decimal(9,4), @procentage
decimal(9,4), @numberofrecords INT, @item_table TINYINT,
@fakeCategoryUID INT, @postingUID INT
DECLARE @ID INT, @views decimal(9,2), @clicks decimal(9,2), @percentage
decimal(9,4), @bid money, @cnt INT, @ctr decimal(9,4), @rating decimal(9,4)
DECLARE @numberofBlocks INT, @av_clicks decimal(9,2), @av_views
decimal(9,2), @av_ctr decimal(9,4), @totalAds tinyint
CREATE TABLE #table2 (blockNumber INT, [ID] INT, ctr decimal(9,4), rating
decimal(9,4), bid money, [views] INT, clicks INT, rating_pr decimal(9,4), view_pr
decimal(9,4), postingUID INT )
CREATE TABLE #table1 ([ID] INT, ctr decimal(9,4), rating decimal(9,4), bid money,
[views] decimal(9,4), clicks decimal(9,4), postingUID INT)
SET @totalAds = 0
-- Get city local -based search result
SET @areaStr = "
IF @area <> 0
SET @areaStr = ' AND area='+Str(@area)
SET @postingSrt = "
IF @dup_postingUID <> 0
SET @postingSrt = ' AND postingUID <> '+Str(@dup_postingUID)
SET @rq = 'DECLARE ad_cursor CURSOR SCROLL KEYSET FOR SELECT TOP 20
[ID], [views], clicks, bid, postingUID FROM dbo.adsWHERE ad_option =
2 AND cityUID='+Str(@cityUID)+' AND local_flag IS NOT NULL AND stop_flag
IS NULL'+@areaStr+@postingSrt
IF @keywords <> "
SET @rq = 'DECLARE ad_cursor CURSOR SCROLL KEYSET FOR SELECT
TOP 20 [ID], [views], clicks, bid, postingUID FROM dbo.adsWHERE FREETEXT
(*,"'+@keywords+'") AND ad_option = 2 AND cityUID='+Str(@cityUID)+' AND
local_flag IS NOT NULL AND stop_flag IS NULL'+@areaStr+@postingSrt
EXEC (@rq)
OPEN ad_cursor
SET @numberofrecords = @@CURSOR_ROWS
FETCH ABSOLUTE 1 FROM ad_cursor INTO @ID, @views, @clicks, @bid,
@postingUID
      SET @cnt=0
      WHILE @@FETCH_STATUS=0 AND @cnt < 20
      BEGIN
SET @ctr = 0
SET @rating = 0
IF @views > 0 AND @clicks > 0
BEGIN
SET @rating =100
SET @ctr = ((@rating / @views) * @clicks)
SET @rating = (@bid * @ctr)
END
INSERT #table1 VALUES (@ID, @ctr, @rating, @bid, @views, @clicks,
@postingUID)
         FETCH NEXT FROM ad_cursor INTO @ID, @views, @clicks;
@bid, @postingUID
            SET @cnt = @cnt+1
            SET @totalAds = @totalAds +1
      END
```

```
CLOSE ad_cursor
DEALLOCATE ad_cursor
-- Get state-based search result (it could be also based on msa, cbsa, csa or
other region criteria)
IF @totalAds < @blockSize
BEGIN
SET @rq = 'DECLARE ad_cursor CURSOR SCROLL KEYSET FOR SELECT
TOP 20 [ID], [views], clicks, bid, postingUID FROM dbo.adsWHERE ad_option =
2 AND stateCode="'+@stateCode+'" AND local_flag IS NULL AND stop_flag IS
NULL'+@areaStr+@postingSrt
IF @keywords <> "
SET @rq = 'DECLARE ad_cursor CURSOR SCROLL KEYSET FOR SELECT
TOP 20 [ID], [views], clicks, bid, postingUID FROM dbo.adsWHERE FREETEXT
(*,"'+@keywords+'") AND ad_option = 2 AND stateCode="'+@stateCode+'"
AND local_flag IS NULL AND stop_flag IS NULL'+@areaStr+@postingSrt
EXEC (@rq)
OPEN ad_cursor
SET @numberofrecords = @@CURSOR_ROWS
FETCH ABSOLUTE 1 FROM ad_cursor INTO @ID, @views, @clicks, @bid,
@postingUID
    SET @cnt=0
    WHILE @@FETCH_STATUS=0 AND @cnt < 20
    BEGIN
SET @ctr = 0
SET @rating = 0
IF @views > 0 AND @clicks > 0
BEGIN
SET @rating =100
SET @ctr = ((@rating / @views) * @clicks)
SET @rating = (@bid * @ctr)
END
INSERT #table1 VALUES (@ID, @ctr, @rating, @bid, @views, @clicks,
@postingUID)
        FETCH NEXT FROM ad_cursor INTO @ID, @views, @clicks;
@bid, @postingUID
        SET @cnt = @cnt+1
        SET @totalAds = @totalAds +1
    END
CLOSE ad_cursor
DEALLOCATE ad_cursor
END
-- Get national search result
IF @totalAds < @blockSize
BEGIN
SET @rq = 'DECLARE ad_cursor CURSOR SCROLL KEYSET FOR SELECT
TOP 20 [ID], [views], clicks, bid, postingUID FROM dbo.adsWHERE ad_option =
2 AND stateCode <> "'+@stateCode+'" AND local_flag IS NULL AND stop_flag
IS NULL'+@areaStr+@postingSrt
IF @keywords <> "
SET @rq = 'DECLARE ad_cursor CURSOR SCROLL KEYSET FOR SELECT
TOP 20 [ID], [views], clicks, bid, postingUID FROM dbo.adsWHERE FREETEXT
(*,"'+@keywords+'") AND ad_option = 2 AND stateCode <> "'+@stateCode+'"
AND local_flag IS NULL AND stop_flag IS NULL'+@areaStr+@postingSrt
EXEC (@rq)
OPEN ad_cursor
SET @numberofrecords = @@CURSOR_ROWS
FETCH ABSOLUTE 1 FROM ad_cursor INTO @ID, @views, @clicks, @bid,
@postingUID
    SET @cnt=0
    WHILE @@FETCH_STATUS=0 AND @cnt < 100
    BEGIN
SET @ctr = 0
SET @rating = 0
IF @views > 0 AND @clicks > 0
BEGIN
SET @rating =100
SET @ctr = ((@rating / @views) * @clicks)
SET @rating = (@bid * @ctr)
END
INSERT #table1 VALUES (@ID, @ctr, @rating, @bid, @views, @clicks,
@postingUID)
        FETCH NEXT FROM ad_cursor INTO @ID, @views, @clicks,
@bid, @postingUID
        SET @cnt = @cnt+1
        SET @totalAds = @totalAds +1
    END
CLOSE ad_cursor
DEALLOCATE ad_cursor
END
```

```
-- run in case to fill out without keywords
IF @keywords <> ''
IF @totalAds < @blockSize
BEGIN
SET @rq = 'DECLARE ad_cursor CURSOR SCROLL KEYSET FOR SELECT
TOP 20 [ID], [views], clicks, bid, postingUID FROM dbo.adsWHERE stop_flag IS
NULL AND ad_option=2 AND local_flag IS NULL AND postingUID NOT IN
(SELECT postingUID FROM #table1) ORDER BY [ID] DESC'
EXEC (@rq)
OPEN ad_cursor
SET @numberofrecords = @@CURSOR_ROWS
FETCH ABSOLUTE 1 FROM ad_cursor INTO @ID, @views, @clicks, @bid,
@postingUID
      SET @cnt=0
      WHILE @@FETCH_STATUS=0 AND @cnt < 100
      BEGIN
SET @ctr = 0
SET @rating = 0
IF @views > 0 AND @clicks > 0
BEGIN
SET @rating =100
SET @ctr = ((@rating / @views) * @clicks)
SET @rating = (@bid * @ctr)
END
INSERT #table1 VALUES (@ID, @ctr, @rating, @bid, @views, @clicks,
@postingUID)
       FETCH NEXT FROM ad_cursor INTO @ID, @views, @clicks,
@bid, @postingUID
           SET @cnt = @cnt+1
           SET @totalAds = @totalAds +1
      END
CLOSE ad_cursor
DEALLOCATE ad_cursor
END
-- Set variables for sorting
DECLARE @totalRating decimal(9,4), @totalViews decimal(9,4), @rating_pr
decimal(9,4), @view_pr decimal(9,4), @avg_rating decimal(9,4), @min_rating
decimal(9,2)
SET @totalRating = (SELECT SUM(rating) FROM #table1)
SET @totalViews = (SELECT SUM([views]) FROM #table1)
--SET @avg_rating = (SELECT AVG(rating) FROM #table1)
SET @avg_rating = (SELECT MAX(rating) FROM #table1)
-- Sort ads by ratings
DECLARE ad_cursor CURSOR SCROLL KEYSET FOR SELECT [ID], ctr, rating,
bid, [views], clicks, postingUID FROM #table1 ORDER BY rating DESC, bid
DESC
OPEN ad_cursor
SET @numberofrecords = @@CURSOR_ROWS
FETCH ABSOLUTE 1 FROM ad_cursor INTO @ID, @ctr, @rating, @bid,
@views, @clicks, @postingUID
     SET @cnt=0
     SET @li = 0
     SET @numberofBlocks = 1
     SET @total_ratinginBlock = 0
     WHILE @@FETCH_STATUS=0 AND @cnt < (@numberofrecords+1)
     BEGIN
IF @li < @blockSize
SET @li = @li+1
ELSE
BEGIN
SET @li = 1
SET @numberofBlocks = @numberofBlocks + 1
END
IF (@views < 100 OR @views IS NULL) AND (@clicks = 0 OR @clicks IS
NULL)
SET @rating = @avg_rating
IF @totalRating > 0
SET @rating_pr = (100 / @totalRating * @rating)
IF @totalViews > 0
SET @view_pr = (100 / @totalViews * @views)
IF @cnt < 5
UPDATE dbo.adsSET [views]=[views] +1 WHERE [ID]=@ID AND ad_option=2
INSERT #table2 VALUES (@numberofBlocks, @ID, @ctr, @rating, @bid,
@views, @clicks, @rating_pr, @view_pr, @postingUID)
       FETCH NEXT FROM ad_cursor INTO @ID, @ctr, @rating,
@bid, @views, @clicks, @postingUID
          SET @cnt = @cnt+1
     END
```

```
CLOSE ad_cursor
DEALLOCATE ad_cursor
DROP TABLE #table1
SELECT TOP 5 a.[ID], a.rating_pr, a.view_pr, b.area, a.postingUID,
b.posting_date, b.main_categoryUID, folder=CASE WHEN b.url='class'THEN
'class' ELSE 'item' END, b.title, heading=CASE
WHEN (b.heading IS NOT NULL AND b.heading <> '') THEN b.heading ELSE
b.heading_alt END, b.price, b.specialPrice, b.onSpecial, b.[description], b.src,
region=(b.city+', '+b.stateCode), b.timeZone, b.categoryName,
b.sub_categoryUID, b.subCategoryName FROM #table2 a INNER JOIN
dbo.depot_items b ON a.postingUID=b.[ID]
DROP TABLE #table2
END
GO
```

Using the data from the dispatcher server, the coding of the .swf template file renders the advertisement, drawing a variety of elements including messaging, including text, images, and third party digital content from a variety of locations. A sample of coding that retrieves the parameter/command data for the ad selected by the auction is provided below:

```
<%@LANGUAGE="VBSCRIPT" CODEPAGE="1252"%>
<%
Dim searchString, numberOfSpots, category, city, stateCode,
postingUID, i
searchString = "key words sent from ad module"
numberOfSpots = 5 ' can be any number starting from 1
category = 3 ' if there are category-based
city = 1180 ' city ID in database
stateCode = "AZ" ' or other region criteria
postingUID = 0 ' needed to filter ads of the product on the actual product
page
i= 0
set adsRs = Server.CreateObject("ADODB.Recordset")
adsRs.ActiveConnection = connection_string
adsRs.CursorType = 0
adsRs.CursorLocation = 2
adsRs.LockType = 3
adsRs.Open("dbo.ab_AdAuction '" & searchString & "', " &
numberOfSpots & ", " & category & ", " & city & ", '" & stateCode &
"', " & postingUID)
While Not adsRs.EOF
Response.Write "&ad" & i "=" & adsRs.Fields.Item("ID").Value
i = i + 1
   adsRs.MoveNext
   Wend
adsRs.Close( )
adsRs.ActiveConnection = Nothing
Set adsRs = Nothing
%>
```

Using data received from the dispatcher server, the coding of the .swf file also establishes a connection to a tracking server which is preferably used to store and provide to system users website advertisement viewer activity tracking data. On viewer interaction, such as via clicks, the coding of the .swf file establishes two substantially simultaneous connections, with one to the indicated tracking server for tracking purposes and the second is the actual link from the ad location to the advertised content (click-through scenario). A sample depiction of an ad parameter/command database file stored in the system dispatcher server is provided in FIG. 4.

The method of the present invention in a preferred embodiment comprises the steps of: selecting one or more digital content files previously stored in electronic file format in a mass storage device of a computer system made available for licensing on a cost-per-click, cost-per-impression or other pay-per-use basis for use in creating an ad for placement on a website or other network location; storing in an ad parameter/command file within a database at the system dispatcher server the commands needed to retrieve and assemble said licensed content as well as the total cost-per-click or other cost-per-use of the licensed content used in the ad, the keyword topic terms, if any, that the ad will be associated with and the advertiser's bid amount for display of the ad at a specified location when the specified search terms are entered as search queries or clicked on as links and tracking parameters, for use upon selection of the ad to be displayed placing an ad billboard module at the desired ad display network location, which, when clicked on by the website user, causes the website or other location to communicate with the dispatcher server to execute an auction to select the ad to be displayed, and then retrieve the stored ad parameter/command file for the selected ad from the dispatcher server database and then using the retrieved values in said data string and commands for said ad placement, to retrieve the ad content files from where they are stored, assemble them into the overall ad and display them at the specified network location. The advertisement viewer is then directed to specified go-to web page(s) depending on said advertisement viewer's activity with respect to said advertisement. The advertiser is charged the total cost-per-click or other cost-per-use charge for the licensed and content and the ad space every time the advertiser's ad is run and, the content licensor and ad space location owner are paid.

In a preferred embodiment, the ad viewer can access and view the advertisements without having to download or cache any files on the website user's system. Utilizing FSDC technology, the ad's custom tracking parameters as well as the ad viewer's actions in clicking on the ad links provided is itself used as a tracking signal by the system and is saved in the related tracking database.

Figure 6:
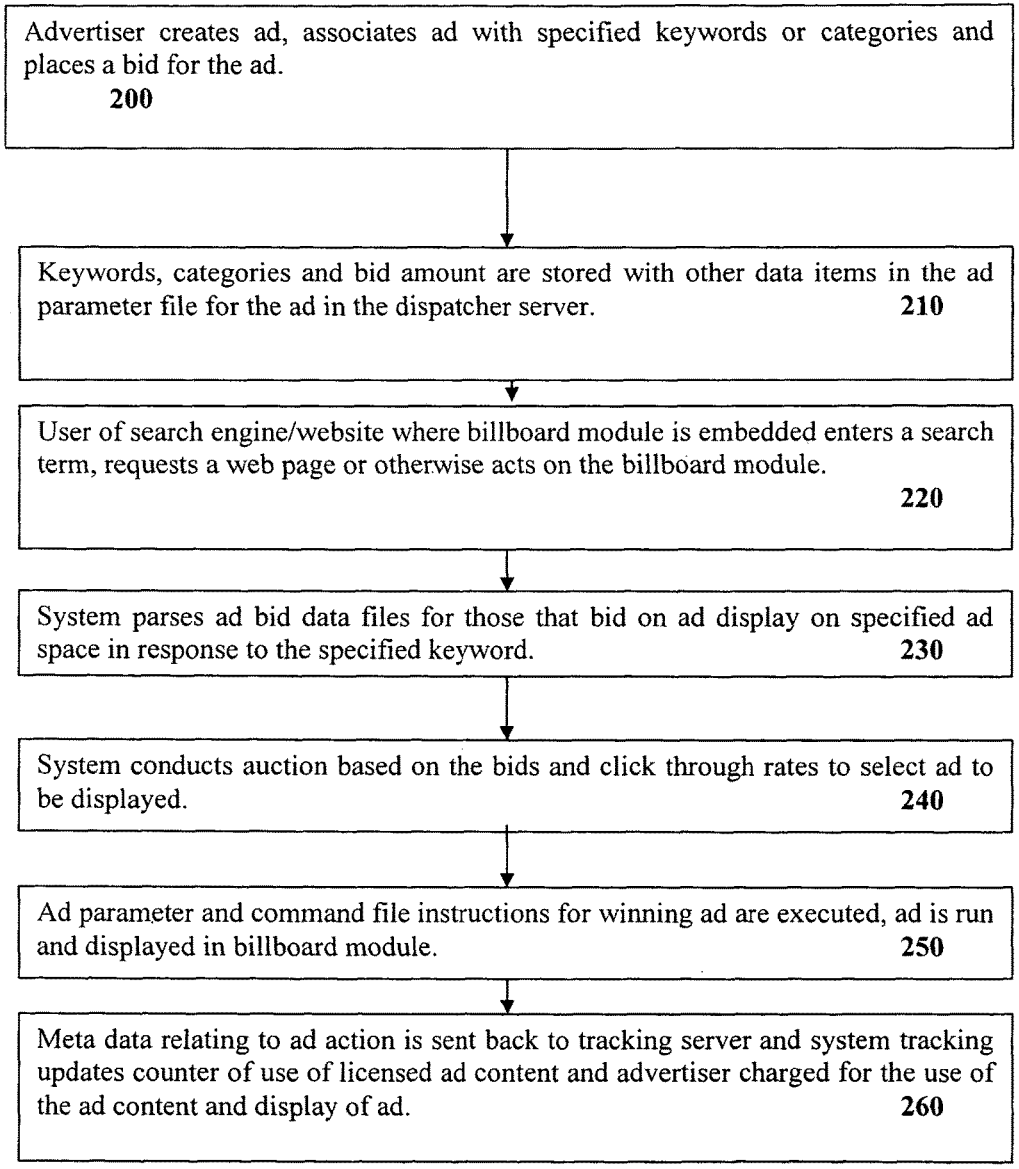
FIG. 6 is a flow chart depicting the ad spot-auction process flow.

Referring now to FIG. 6, when a network user (in an Internet-based embodiment) requests a webpage where the billboard module is embedded, referencing a keyword, or enters a query using the keyword 220, the billboard module executes a request to the system's dispatcher server to run an auction for selection of the particular ad file to be displayed from the group of ad files that have the same keyword and display location references based on the bids placed for display of such ads 240 and then to retrieve the ad placement parameter file for the selected ad 200. This ad file may be a static HTML image file, but also may be an advertising template file that plays within the module and refers to the dispatcher server which contains unique identifiers for that particular ad placement transaction stored in the database. The database can be in SQL Server format, or, alternatively, it can be in Oracle, Microsoft Access or any other server-based database format. The database stores the unique parameters for the particular ad placement rendering. The stored information contains the following components in addition to other customizable parameters:
1. URL link to the ad content files to be shown (the ad content files can be located on any server, but are preferably stored in a database within a separate content server so that updating of content files can be done separately from use of the system at one web location rather than on every website where an ad is placed).
2. Variables that hold custom parameters for tracking (as many as needed), including link(s) to click action target page or pages.
3. The cost-per-click or other cost-per-use charge total for the licensed content used in the ad.
4. The "bid" price for display of the ad in a desired location and/or in response to one or more specified search query terms.
5. The specified search keywords/query terms with which the ad will be associated.

The dispatcher server, in response to the request, initiates the link to the ad template file at the ad server and passes into it the following information: messaging including text and font format, location of images, location of third party digital content files, Location of link to go-to page and variables that contain custom tracking parameters 210. The ad then grabs this information from the query string and acts accordingly (displaying ad file 250 and sending tracking parameters to a tracking server using FSDC in a preferred embodiment 260).

System Screens

As further described below, FIGS. 7-35 depict representative samples of the system's graphical user interface screens, which provide a system user template for creating parameter/command uniform resource locator address data string files for retrieval, assembly and display, to be stored as files within the database of the dispatcher server.

FIGS. 9-21, each discussed further below, depict sample system user screens for users of the system seeking to create and place ads. These screens walk the advertiser through a straightforward process of creating the ad, including selection of ad content, inputting text and messaging for the ad, designating the ad title, click destination, size, associated keywords and/or categories, ad placement payment options, budgeting, geographic region for ad coverage and other parameters. The screens can have, as depicted in the samples, main menu items such as "Create New Ad" which leads to the screens for creating new ads and "My Rich Media Ads" which leads to screens whereby the users of the system can access and use the ads.

FIG. 7 depicts a sample system user/advertiser user registration login screen. Users who are registered with the system enter their user identification and password to access the system as depicted in FIG. 8. New operator users must register with the system by completing an online form as depicted in FIG. 7. Once logged in, website operator users are presented with a screen such as FIG. 8 which has various options, including edit user information, portfolio and tracking and add new advertisement.

Figure 10:
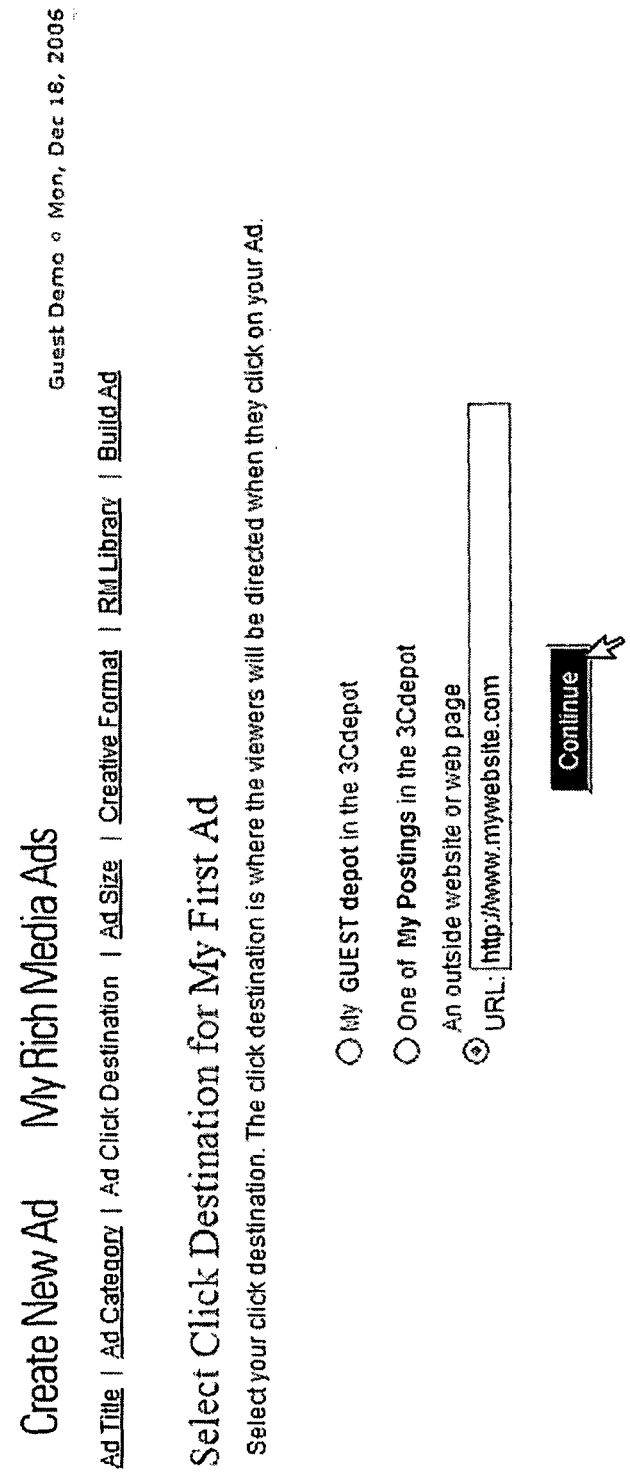
FIG. 10 depicts a sample advertisement click destination input screen.
Figure 11:
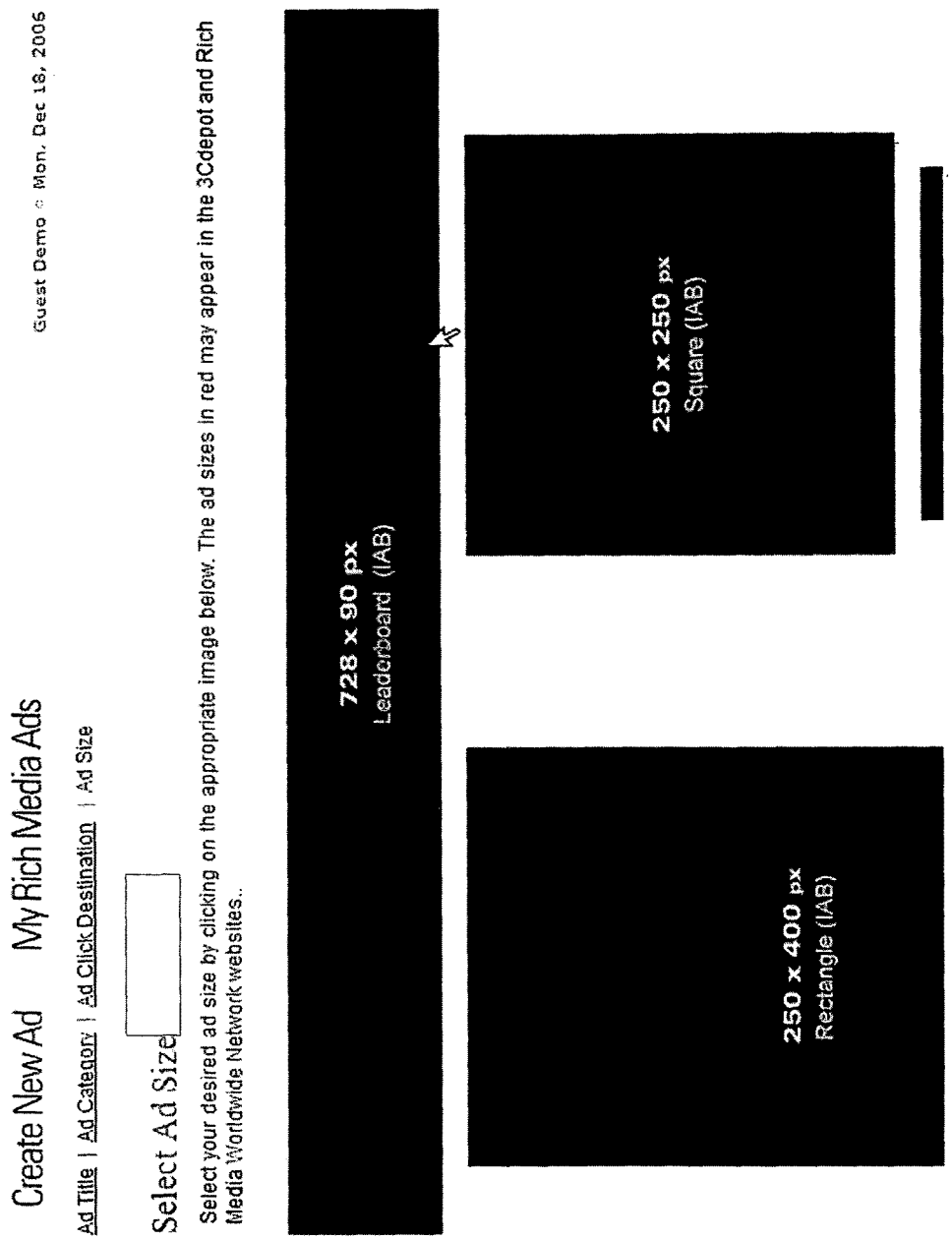
FIG. 11 depicts a sample system user ad size selection screen.
Figure 13:
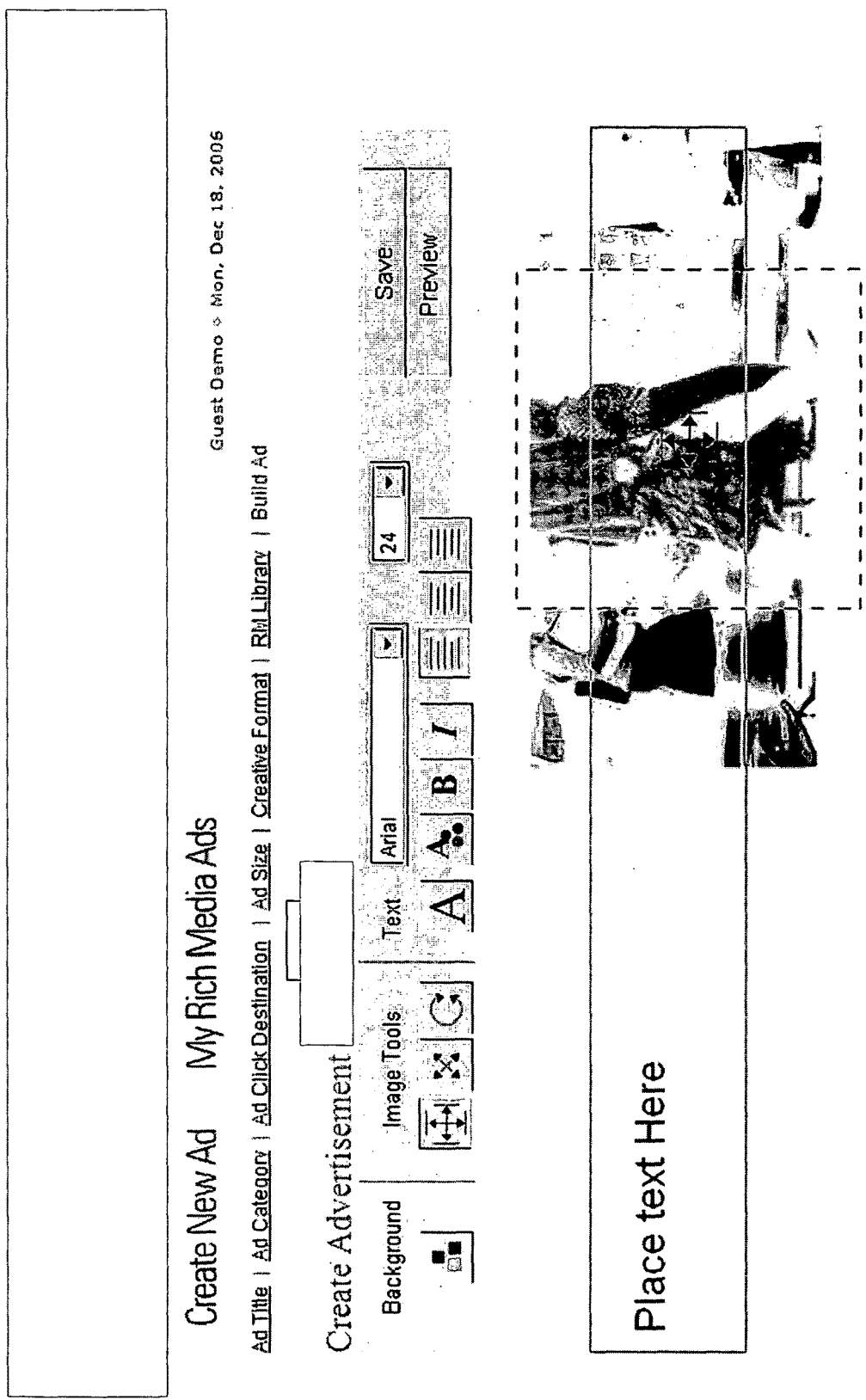
FIG. 13 depicts a sample system ad text and messaging input screen.
Figure 20:
FIG. 20 depicts a sample ad budget data input screen.

FIG. 9 depicts a sample advertisement creation input screen. After logging in, the advertisers enters a title for the ad to be created. The advertiser then enters the destination for the advertisement, which is where the ad viewers will be directed when they click on the ad. The advertiser can designate its own website or a third party website or can designate the system's e-commerce depot which allows advertisers that do not have e-commerce capability of their own to use the system's features which allow ad viewers to purchase the advertiser's products on services, providing electronic payment and order/purchase processing. FIG. 10 depicts a sample advertisement click destination input screen. The advertiser then selects the ad size at a screen such as the sample screen depicted in FIG. 11. The advertiser then selects the ad creative content files to be used in the ad, via a content library provided via a user screen such as the sample screen depicted in FIG. 12. The advertiser then enters the advertiser's desired ad text and messaging, via an input screen such as the sample ad text and messaging input screen depicted in FIG. 13. The advertiser then previews and saves the ad, via a screen such as the sample preview and save screen depicted in FIG. 14. The advertiser then selects the geographic region for which to run the ad. This feature enables very targeted advertising. FIG. 15 depicts a sample geographic region input screen. The advertiser then selects a payment program for the ad via an ad placement options screen such as the sample screen depicted in FIG. 16. The options, as previously mentioned can include all varieties of payment, such as, without limitation, pay-per-click, payment of a specified fixed amount for a specified number of views, ad swapping, bartering, and other payment options. The advertiser then enters keywords to be associated with the ad, as well as the advertiser's bid for display of the ad when triggered by the designated keywords. FIG. 17 depicts a sample keyword and maximum bid amount input screen, in an embodiment utilizing a pay per click ad charging payment option. The advertiser can test in real time the effectiveness of its keyword and bid selections and calibrate them accordingly to achieve best results. The advertiser also creates an advertising budget if the ad is being paid for via a pay per view/impression payment option, via an ad placement plan budget input screen such as the sample screen depicted in FIG. 18. The advertiser also can select target categories to be associated with the ad, via a target category selection screen such as the sample screen depicted in FIG. 19. FIG. 20 depicts a sample of another ad budget data input screen where an advertiser can create a budget using different parameters, such as, for example, but without limitation, a maximum several budget or a maximum daily limit. The advertiser then enters payment information, such as the advertiser's credit card data to pay for the ad. When the advertiser clicks "Submit" as depicted in FIG. 21 (an ad payment data input screen), all of the ad information is sent to the dispatcher server and the ad is published.

FIGS. 22-32, each discussed further below depict sample system users screens for users that have websites and are seeking to publish ads on their own site. As shown in the figures referenced above, the screens can have several menu items, such as, for example but without limitation, "My Websites" which includes the ad publisher's website information, "My Billboards," which includes the parameter files for billboards established by the ad publisher, and "Create New Billboard," which leads to the screens that take the ad publisher through the steps for establishing a billboard for display of system ads.

Figure 24:
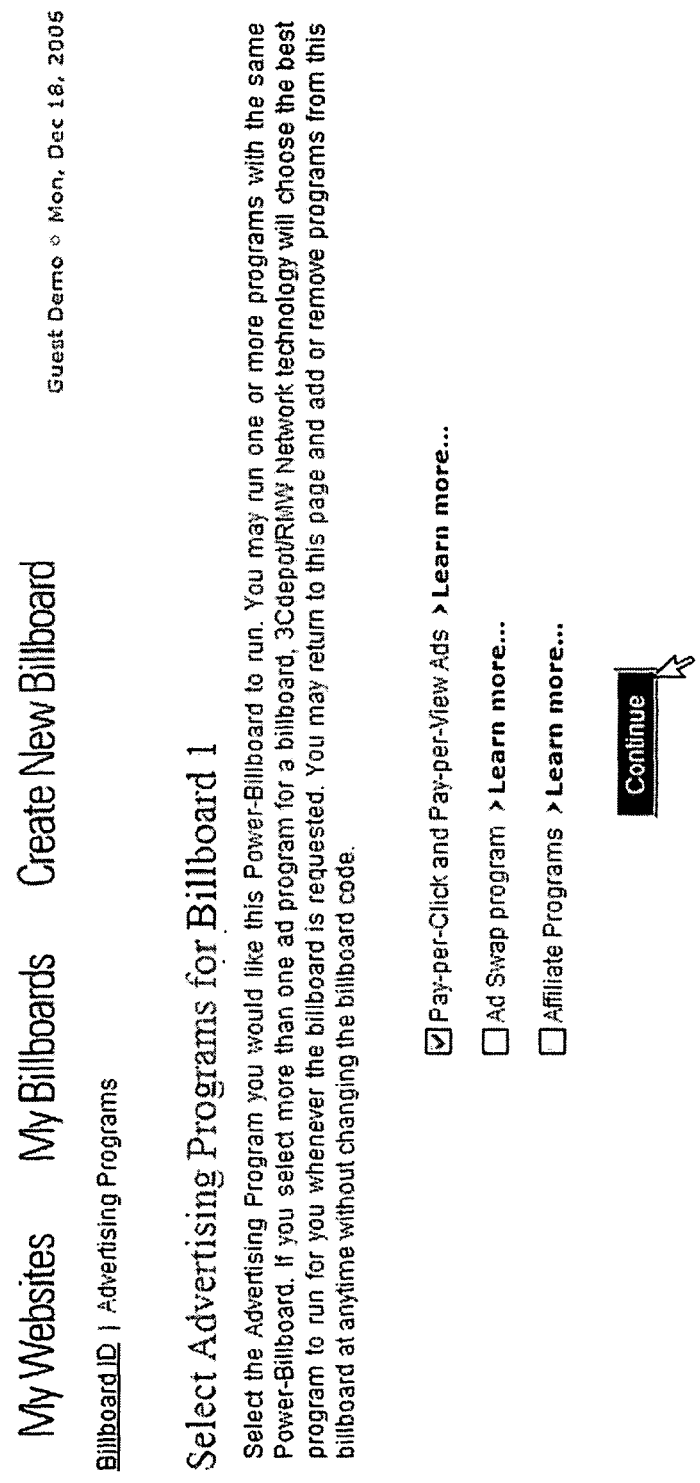
FIG. 24 depicts a sample billboard advertising program selection screen.
Figure 25:
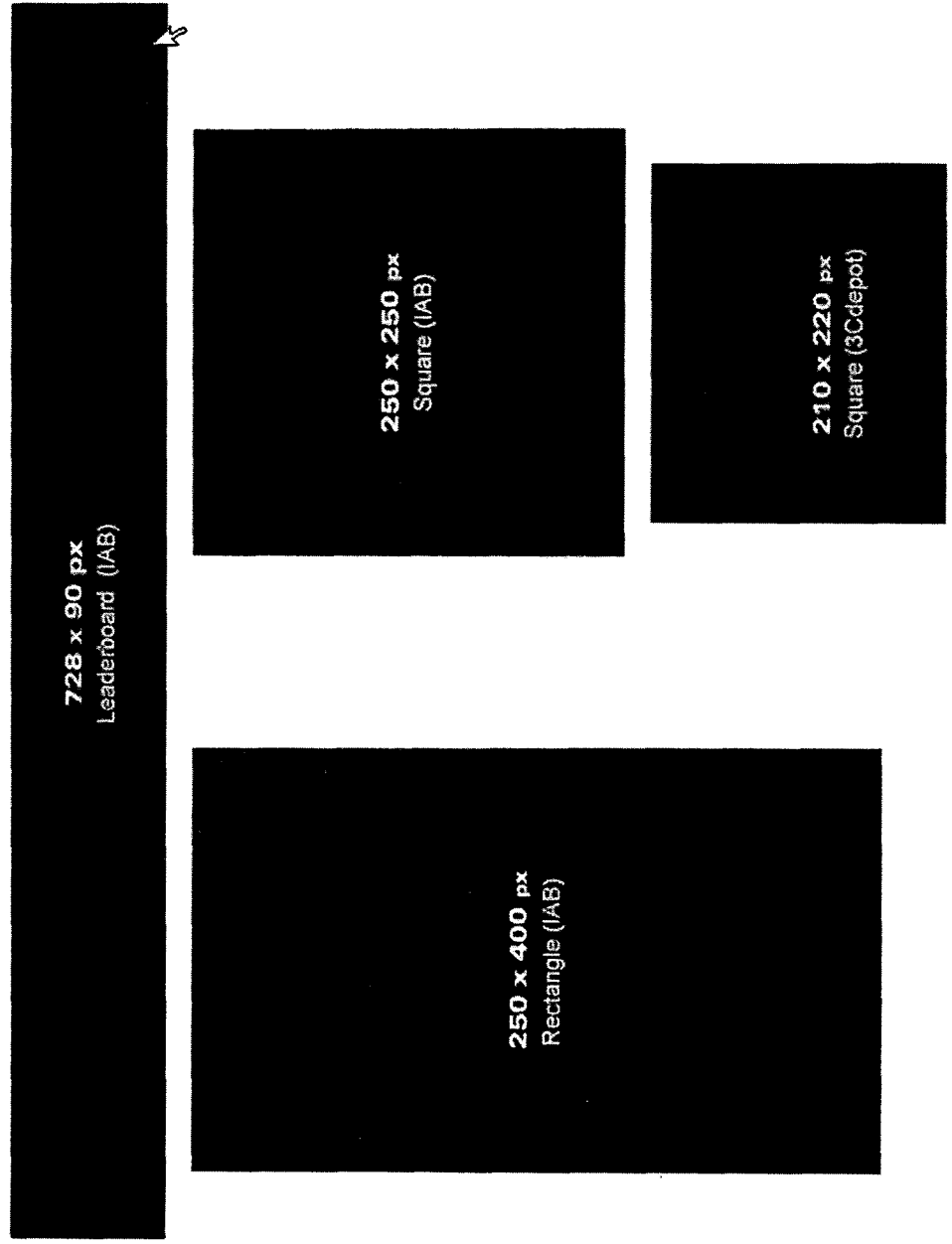
FIG. 25 depicts a sample ad publisher billboard size selection screen.
Figure 26:
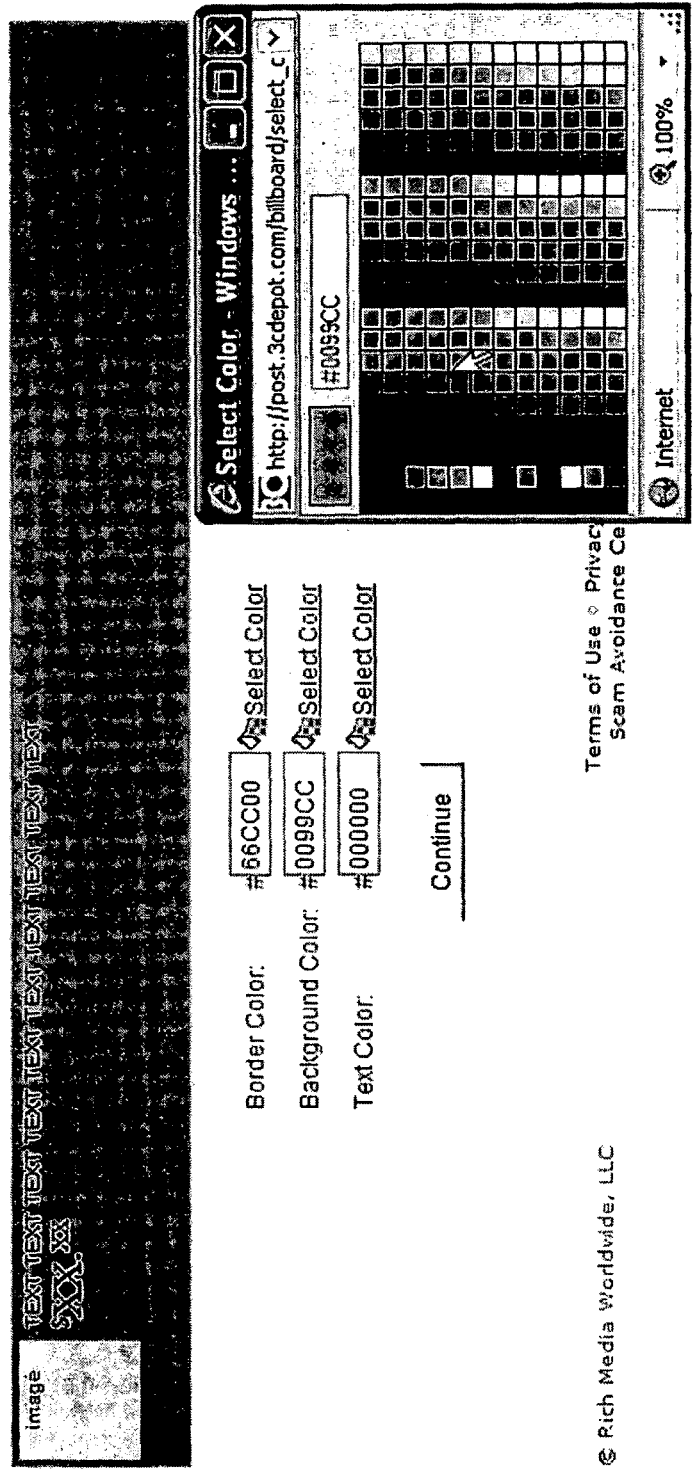
FIG. 26 depicts a sample billboard module customization selection screen.
Figure 28:
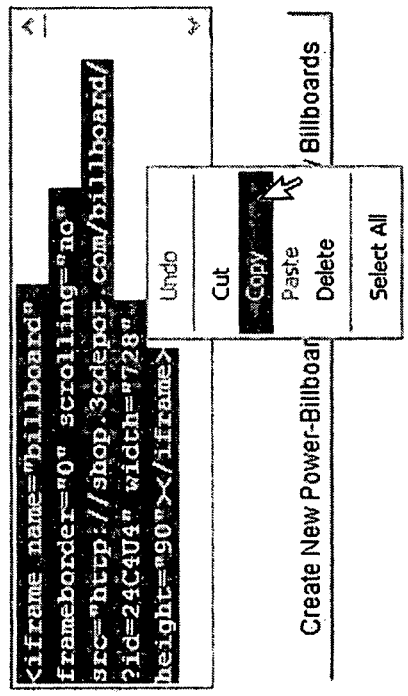
FIG. 28 depicts a sample ad publisher billboard code copying screen.
Figure 31:
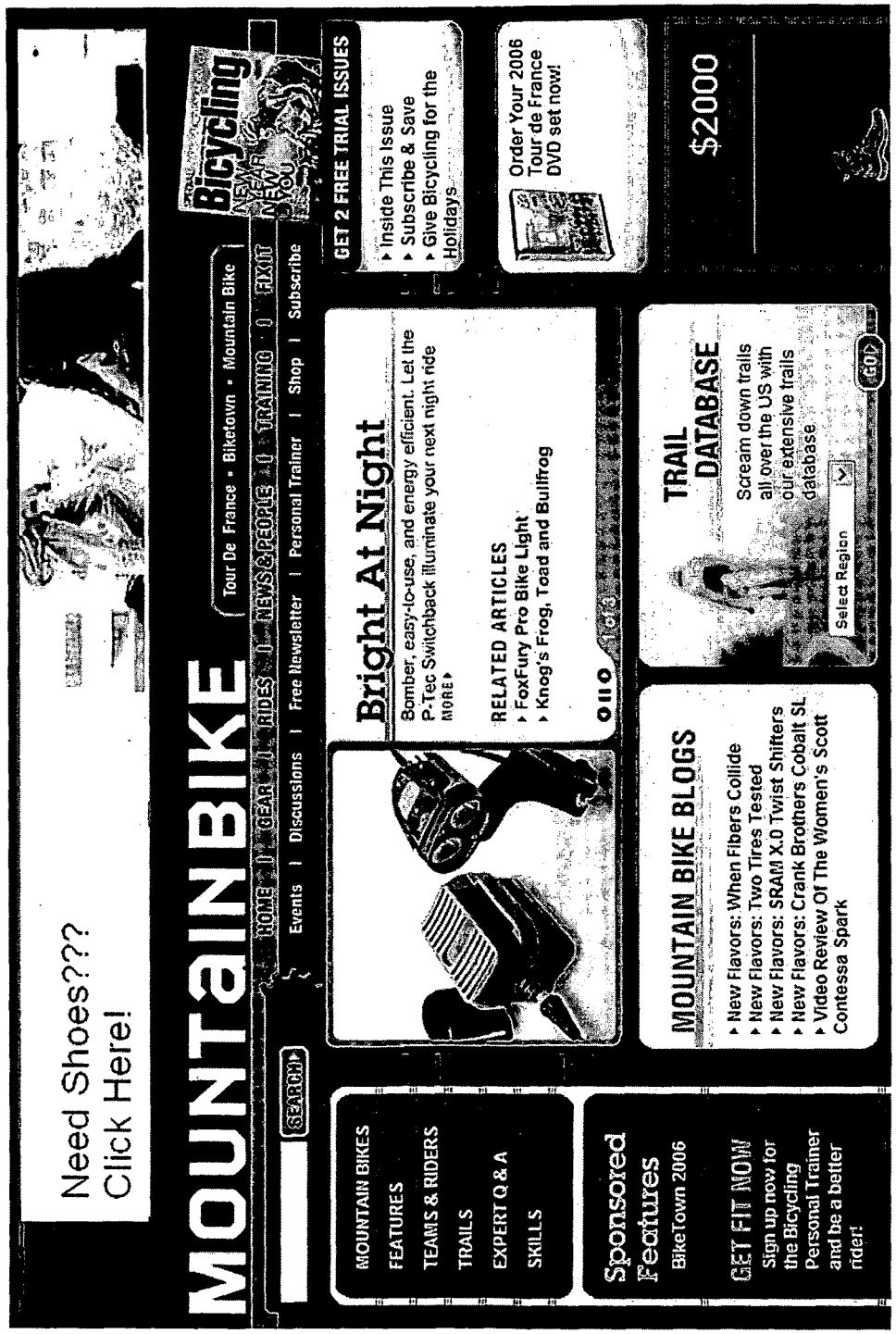
FIG. 31 depicts a sample ad publisher billboard location within an ad publisher web page, showing billboard module placement at top bar.
Figure 32:
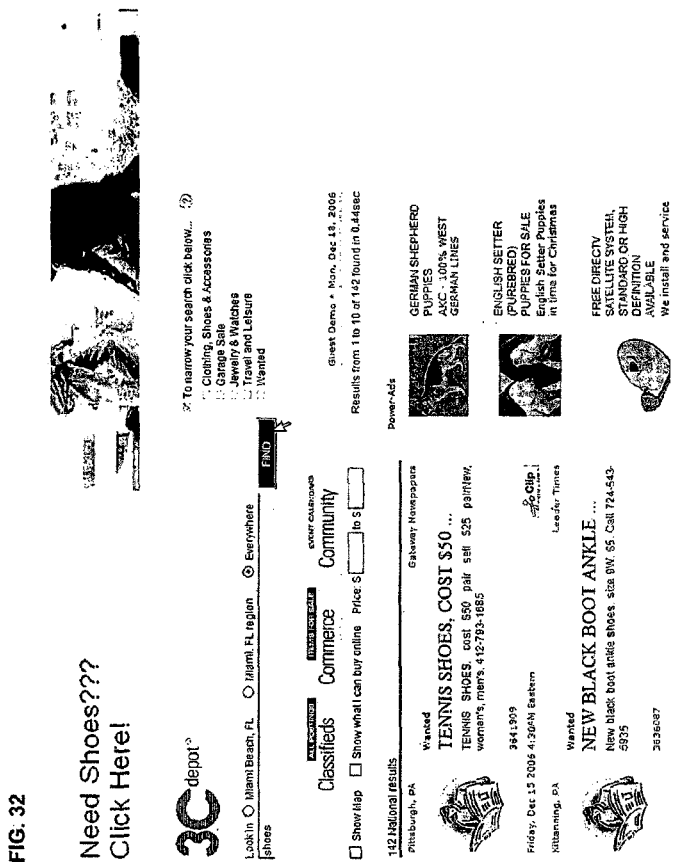
FIG. 32 depicts a sample rendered ad in an ad publisher search engine web page screen.

Ad publishers first register their website and upload their website logo into the system via a Website Registration screen such as the sample screen depicted in FIG. 22. The ad publisher then enters an identification for the billboard to be created via a billboard ID input screen such as the sample depicted in FIG. 23. The ad publisher selects a payment program to associate with the billboard being created. These are the parameters by which the ad publisher would charge when an ad is displayed in the billboard. FIG. 24 depicts a sample advertising program selection screen, showing three non-limiting examples of options, such as pay per click or pay per view, ad swapping and affiliate programs. The ad publisher also selects the size for the billboard via a size selection screen such as the sample depicted in FIG. 25. The ad publisher can customize the billboard by selecting border color, background color, text color or select options to match the ad publisher's website. FIG. 26 depicts a sample customization selection screen. The ad publisher then selects target categories to be associated with the billboard for relevant ad placement. FIG. 27 depicts a sample billboard target category selection screen. The ad publisher then receives code to copy and paste into their website page, via a "Get Code for Billboard" screen such as the sample depicted in FIG. 28. If an interstitial advertisement billboard is set up, (where the advertisement runs between web pages) the ad publisher is also prompted to enter the URL for the skip/destination web page. FIG. 29 depicts a sample skip/destination URL input screen. In the case of interstitial ads, the ad publisher is given a unique URL generated by the system which the publisher copies and pastes into the ad publisher's website in the place of the skip/destination URL. When an ad viewer clicks on the link/billboard space, the user first sees the interstitial ad, then the destination page. If the viewer clicks on the ad then the viewer is directed to the interstitial ad's destination URL that was specified, by the advertiser that created the ad. FIG. 30 depicts a sample interstitial URL copying screen. The ad publisher places the billboard module code in their website. When the website page is requested, the billboard module communicates with the dispatcher server and an advertiser's ad is selected and rendered in the billboard module space on the designated page. FIG. 31 depicts a sample ad publisher billboard location within a website screen, showing the placement of the billboard module, represented by the "Need Shoes??? Click Here!" area of the screen. With search engine websites, when the page is requested, the system determines the searched keyword and passes it to the billboard module and the billboard module communicates with the system dispatcher server and advertiser's ad is selected and rendered in the billboard module on the ad publisher's web page. A sample of a rendered shoe ad in response to a query using the Keyword "Shoes" is depicted in the sample ad publisher search engine web page screen in FIG. 32. The system also provides various operational parameter/data screens. FIG. 33 depicts a sample ad parameter data base listing showing multiple ad parameter files. FIG. 34 depicts a sample ad campaign statistics screen with data regarding performance of ads and budget consumption. FIG. 35 depicts a sample single ad statistic screen.

Figure 14:
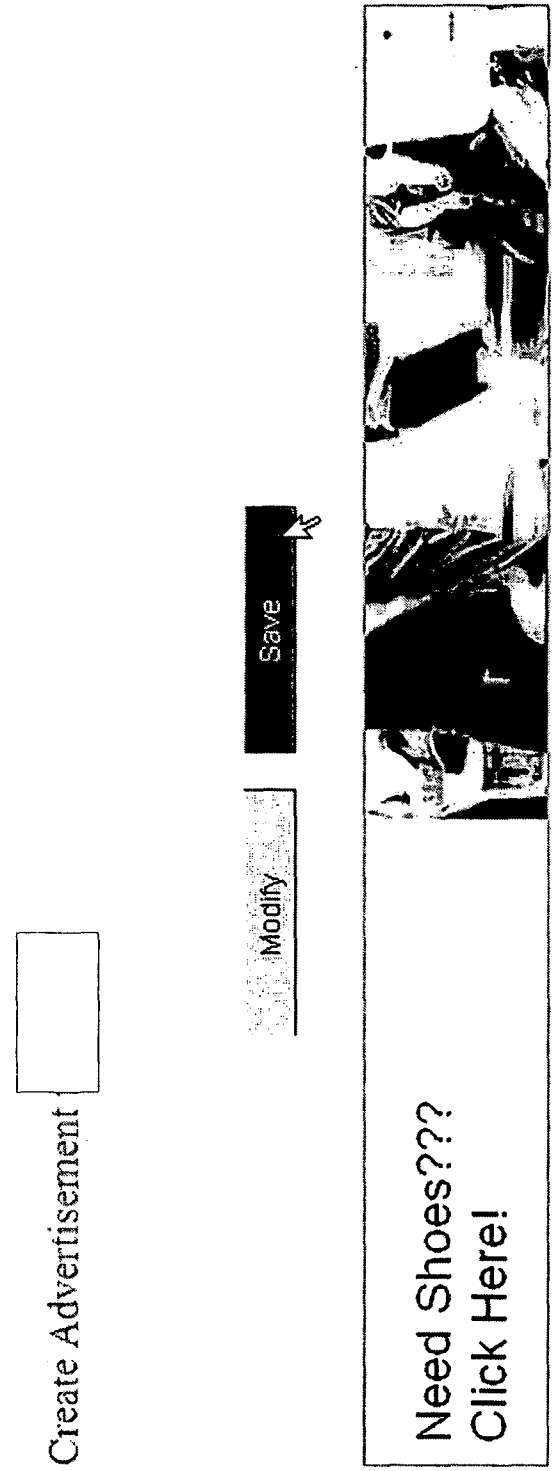
FIG. 14 depicts a sample system ad preview and save screen.

Information about the content file(s) selected are saved in the system ad parameter file database as a row of data and a unique ID is given to the row as shown in FIG. 14. In the example in FIG. 14, the unique id is noted in Column A, the cost per use of the licensed ad content used in the ad is noted in Column H and the cost-per-click bid by the advertiser for display of the ad in response to keywords specified in Column J is noted in Column I. The ad display location owner is also registered with the system and the offered ad display space is embedded with a billboard module associated with specified keywords designated by the ad display location's owner. The designation by the ad space owner/ad publisher of keywords to be associated with the billboard module embedded at a particular network location enables the ad space owner to designate the subject matter of ads that the ad space owner would like to run at the particular location. When a network user/ad viewer either requests a web page that contains the embedded billboard module, otherwise acts on the billboard module or enters one of the designated keywords as a query, the system conducts the auction to select the ad to be displayed from the group of ads that reference the same keyword and display location, and then the ad parameter/command file for the selected ad is accessed and the commands are retrieved and run, retrieving, assembling and displaying the licensed content files in accordance with the instructions.

As shown in FIGS. 34 and 35, which depict sample system tracking screens, meta data on any action taken on the ad is sent back to the database file for the ad via FSDC, and the licensed ad content usage and ad display location charges are applied. The advertiser preferably places a deposit with the system to be drawn against as the advertiser's ad is displayed.

The ad spots can be made available either generally or in relation to the use of specified search terms or keywords. In the case of a website, the website operator can designate keywords that relate to a particular ad space by entering the words into the code for the billboard module that will be embedded at the ad space location. This is done via the system user interface when the web publisher creates a billboard module. In case of a search engine, keywords can be assigned to an ad space from the search field entry. Advertisers seeking to place an ad at the ad space noted enter into the system ad parameter data file the specific keywords to be associated with the ad and a maximum bid for display of the ad at the designated space when the designated keywords are entered as search queries. The ads are displayed once selected based on the bid for each ad or other customizable parameters such as, for example, frequency of display (e.g., display the ad periodically, such as once a day or every five ads displayed, or other). Advertisers can run test auctions to assess the bid amount and frequency of display of the ad based on such bid amount. Sample system code for executing a test auction is provided below:

Sample Test Bid Ad Auction SQL procedure:

```
CREATE PROCEDURE dbo.ab_testAdauction
(@postingUID INT, @ad_option INT, @test_bid money, @blockSize
INT, @keywords nvarchar(150), @search nvarchar(50), @showtime
decimal(9,2) OUTPUT, @best_ctr decimal(9,2) OUTPUT, @competitors
INT OUTPUT, @goodwords INT OUTPUT)
AS
SET NOCOUNT ON
BEGIN
-- Check first 5 search words (where search is URLencrypted string)
against keywords
DECLARE @mesStr varchar(60), @curStr INT, @var1 varchar(60),
@var2 varchar(60), @var3 varchar(60), @var4 varchar(60), @var5
varchar(60)
BEGIN
SET @goodwords = 0
IF (@keywords LIKE '% '+@search+' %' OR LEFT(@keywords,
LEN(@search)+1) LIKE @search+' %' OR RIGHT(@keywords,
LEN(@search)+1) LIKE '% '+@search+' ')
SET @goodwords = 1
ELSE
BEGIN
SET @var1 = ''
SET @var2 = ''
SET @var3 = ''
SET @var4 = ''
SET @var5 = ''
SET @mesStr = @search
-- Word # 1
SET @curStr = 0
WHILE @curStr < LEN(@mesStr)
```

```
BEGIN
IF SUBSTRING (@mesStr, @curStr,1) = '+'
IF @var1 = ''
BEGIN
SET @var1 = LEFT(@mesStr,@curStr −1)
SET @mesStr = RIGHT(@mesStr, LEN(@mesStr) − (LEN(@var1)+1))
END
SET @curStr = @curStr +1
END
IF @var1 = ''
SET @var1 = @mesStr
ELSE
IF (@keywords LIKE '% '+@var1+' %' OR LEFT(@keywords,
LEN(@var1)+1) LIKE @var1+' %' OR RIGHT(@keywords,
LEN(@var1)+1) LIKE '% '+@var1+' ')
SET @goodwords = 1
-- Word # 2
IF LEN(@search) >= (LEN(@mesStr) + 1 + LEN(@var1))
BEGIN
SET @curStr = 0
WHILE @curStr < LEN(@mesStr)
BEGIN
IF SUBSTRING (@mesStr, @curStr,1) = '+'
IF @var2 = ''
BEGIN
SET @var2 = LEFT(@mesStr,@curStr −1)
SET @mesStr = RIGHT(@mesStr, LEN(@mesStr) − (LEN(@var2)+1))
END
SET @curStr = @curStr +1
END
IF @var2 = ''
SET @var2 = @mesStr
END
IF (@keywords LIKE '% '+@var2+' %' OR LEFT(@keywords,
LEN(@var2)+1) LIKE @var2+' %' OR RIGHT(@keywords,
LEN(@var2)+1) LIKE '% '+@var2+' ')
SET @goodwords = 1
-- Word # 3
IF LEN(@search) >= (LEN(@mesStr) + 1 + LEN(@var1) + 1 +
LEN(@var2))
BEGIN
SET @curStr = 0
WHILE @curStr < LEN(@mesStr)
BEGIN
IF SUBSTRING (@mesStr, @curStr,1) = '+'
IF @var3 = ''
BEGIN
SET @var3 = LEFT(@mesStr,@curStr −1)
SET @mesStr = RIGHT(@mesStr, LEN(@mesStr) − (LEN(@var3)+1))
END
SET @curStr = @curStr +1
END
IF @var3 = ''
SET @var3 = @mesStr
ELSE
IF @search LIKE @var3 SET @goodwords = 1
END
IF (@keywords LIKE '% '+@var3+' %' OR LEFT(@keywords,
LEN(@var3)+1) LIKE @var3+' %' OR RIGHT(@keywords,
LEN(@var3)+1) LIKE '% '+@var3+' ')
SET @goodwords = 1
-- Word # 4
IF LEN(@search) >= (LEN(@mesStr) + 1 + LEN(@var1) + 1 +
LEN(@var2) + 1 + LEN(@var3))
BEGIN
SET @curStr = 0
WHILE @curStr < LEN(@mesStr)
BEGIN
IF SUBSTRING (@mesStr, @curStr,1) = '+'
IF @var4 = ''
BEGIN
SET @var4 = LEFT(@mesStr,@curStr −1)
SET @mesStr = RIGHT(@mesStr, LEN(@mesStr) − (LEN(@var4)+1))
END
SET @curStr = @curStr +1
END
IF @var4 = ''
SET @var4 = @mesStr
ELSE
IF @search LIKE @var4 SET @goodwords = 1
END
IF (@keywords LIKE '% '+@var4+' %' OR LEFT(@keywords,
LEN(@var4)+1) LIKE @var4+' %' OR RIGHT(@keywords,
LEN(@var4)+1) LIKE '% '+@var4+' ')
SET @goodwords = 1
-- Word # 5
IF LEN(@search) >= (LEN(@mesStr) + 1 + LEN(@var1) + 1 +
LEN(@var2) + 1 + LEN(@var3) + 1 + LEN(@var4))
BEGIN
SET @curStr = 0
WHILE @curStr < LEN(@mesStr)
BEGIN
IF SUBSTRING (@mesStr, @curStr,1) = '+'
IF @var5 = ''
BEGIN
SET @var5 = LEFT(@mesStr,@curStr −1)
SET @mesStr = RIGHT(@mesStr, LEN(@mesStr) − (LEN(@var5)+1))
END
SET @curStr = @curStr +1
END
IF @var5 = ''
SET @var5 = @mesStr
ELSE
IF @search LIKE @var1 SET @goodwords = 1
END
IF (@keywords LIKE '% '+@var5+' %' OR LEFT(@keywords,
LEN(@var5)+1) LIKE @var5+' %' OR RIGHT(@keywords,
LEN(@var5)+1) LIKE '% '+@var5+' ')
SET @goodwords = 1
END
END
IF @goodwords=1
BEGIN
SET @search = Replace(@search,'+',' ')
IF EXISTS (SELECT postingUID FROM dbo.ad_classifieds WHERE
FREETEXT(*, @search) AND stop_flag IS NULL AND ad_option=1
AND postingUID <> @postingUID AND postingUID IS NOT NULL)
-- There are competitors!!!
BEGIN
-- Set temp tables
CREATE TABLE #table2 (blockNumber INT DEFAULT (0), [ID] INT
DEFAULT (0), ctr decimal(9,4) DEFAULT (0), rating decimal(9,4)
DEFAULT (0), bid money DEFAULT (0), [views] decimal(9,4)
DEFAULT (0), clicks decimal(9,4) DEFAULT (0))
CREATE TABLE #table1 ([ID] INT DEFAULT (0), postingUID INT
DEFAULT (0), ctr decimal(9,4) DEFAULT (0), rating decimal(9,4)
DEFAULT (0), bid money DEFAULT (0), [views] decimal(9,4)
DEFAULT (0), clicks decimal(9,4) DEFAULT (0))
-- Set common variables
DECLARE @totalRating decimal(9, 2), @blockRating decimal(9, 2),
@blockNumber INT, @rq varchar(8000)
DECLARE @li INT, @record_postingUID INT, @total_ratinginBlock
decimal(9,4), @procentage decimal(9,4), @numberofrecords INT
DECLARE @ID INT, @views decimal(9,2), @clicks decimal(9,2),
@percentage decimal(9,4), @bid money, @cnt INT, @ctr decimal(9,4),
@rating decimal(9,4)
DECLARE @numberofBlocks INT, @av_clicks decimal(9,2),
@av_views decimal(9,2), @av_ctr decimal(9,4)
-- Set request and run it
SET @rq='DECLARE ad_cursor CURSOR SCROLL KEYSET FOR
SELECT [ID], postingUID, [views], clicks, bid FROM dbo.ads WHERE
FREETEXT (*,'''+@search+''') AND stop_flag IS NULL AND
ad_option='+Str(@ad_option)+' AND postingUID <>
'+STR(@postingUID)
EXEC (@rq)
OPEN ad_cursor
SET @numberofrecords = @@CURSOR_ROWS
FETCH ABSOLUTE 1 FROM ad_cursor INTO @ID,
@record_postingUID, @views, @clicks, @bid
    SET @cnt=0
    WHILE @@FETCH_STATUS=0
    BEGIN
-- Set click through rate and rating based on bid amount and click
through rate as a coefficient
SET @ctr = 0
SET @rating = 0
IF (@views > 0 AND @clicks > 0 AND @bid > 0)
```

```
BEGIN
SET @ctr = ((100 / @views) * @clicks)
SET @rating = (@bid * @ctr)
END
-- save record in temp table
INSERT #table1 VALUES (@ID, @record_postingUID, @ctr, @rating,
@bid, @views, @clicks)
        FETCH NEXT FROM ad_cursor INTO @ID,
@record_postingUID, @views, @clicks, @bid
        SET @cnt = @cnt+1
    END
CLOSE ad_cursor
DEALLOCATE ad_cursor
-- Set testing click through rate and rating based on average stats
IF EXISTS (SELECT [ID] FROM #table1 WHERE ctr > 0)
BEGIN
SELECT @av_views = AVG([views]), @av_clicks = AVG([clicks]),
@av_ctr = AVG(ctr) FROM #table1
SET @rating=(@test_bid * @av_ctr)
END
ELSE
SELECT @av_views=0, @av_clicks=0, @av_ctr=0,
@rating=100.00/(@numberofrecords+1)
-- Keep testing record
INSERT INTO #table1 ([ID], postingUID, ctr, rating, bid, [views], clicks)
VALUES (0, @postingUID, @av_ctr, @rating, @test_bid, @av_views,
@av_clicks)
-- Sort by ratings and blocks to be shown where rating is used as % of
total views
DECLARE ad_cursor CURSOR SCROLL KEYSET FOR SELECT [ID],
ctr, rating, bid, [views], clicks FROM #table1 ORDER BY rating DESC
OPEN ad_cursor
FETCH ABSOLUTE 1 FROM ad_cursor INTO @ID, @ctr, @rating,
@bid, @views, @clicks
    SET @cnt=0
    SET @li = 0
    SET @numberofBlocks = 1
    SET @total_ratinginBlock = 0
    WHILE @@FETCH_STATUS=0
    BEGIN
IF @li < @blockSize
SET @li = @li+1
ELSE
BEGIN
SET @li = 1
SET @numberofBlocks = @numberofBlocks + 1
END
IF @av_ctr=0 SET @rating = 100.00/(@numberofrecords+1)
INSERT #table2 VALUES (@numberofBlocks, @ID, @ctr, @rating,
@bid, @views, @clicks)
        FETCH NEXT FROM ad_cursor INTO @ID, @ctr,
@rating, @bid, @views, @clicks
        SET @cnt = @cnt+1
    END
CLOSE ad_cursor
DEALLOCATE ad_cursor
SELECT @blockNumber=blockNumber FROM #table2 WHERE [ID]=0
SET @totalRating = 0
SET @blockRating = 0
IF EXISTS (SELECT rating FROM #table2 WHERE rating > 0)
BEGIN
SELECT @totalRating=SUM(rating) FROM #table2
SELECT @blockRating=SUM(rating) FROM #table2 WHERE
blockNumber=@blockNumber
END
-- Get % of the times for the testing ad will show up
SET @showtime = 0
IF @totalRating > 0 AND @blockRating > 0
SET @showtime=ROUND((100.00/@totalRating * @blockRating),2)
-- Get the best click through rate
SET @best_ctr = 0
SELECT @best_ctr=MAX(ctr) FROM #table2 WHERE [ID] <> 0
-- Get number of competitors
SET @competitors = @numberofrecords
SELECT * FROM #table1
SELECT * FROM #table2
DROP TABLE #table1
DROP TABLE #table2END
ELSE
-- No competitors
SELECT @blockNumber=1,@best_ctr=0, @showtime=100,
@competitors=0
END
ELSE
-- Keywords do not contains search words
SELECT @blockNumber=0, @best_ctr=0, @showtime=0,
@competitors=0
END
GO
```

When the billboard module embedded in the ad space and the web page is requested or otherwise acted upon by a network user/ad viewer, the ad module is initiated and a message is sent to the system dispatcher server passing the specific keyword and ad space data for the system software applications to identify the group of ads that will participate in the auction, and then conduct the auction for the spot to determine which ad will be displayed in the particular instance. A number of variables can be compared in the auction selection process, including, for example, the number of ads in queue that are associated with the keyword at the time of the request, the number of total available advertising spots associated with the keyword, bid amount, and the current click-through rate of each ad associated with the keyword. The advertisement that is selected is then displayed and the advertiser is charged each time the ad is displayed or clicked for both use of the licensed content comprising the ad and the display of the ad at the designated location. The advertiser can easily manage an online ad campaign based on a budget, geographical region and tracking details such as click-through rate, and sales rate, as shown in the system advertiser account screen. The system allows for targeted advertising with increased flexibility, as the ad placement and selection for display is not limited to any search system or technology.

Figure 36:
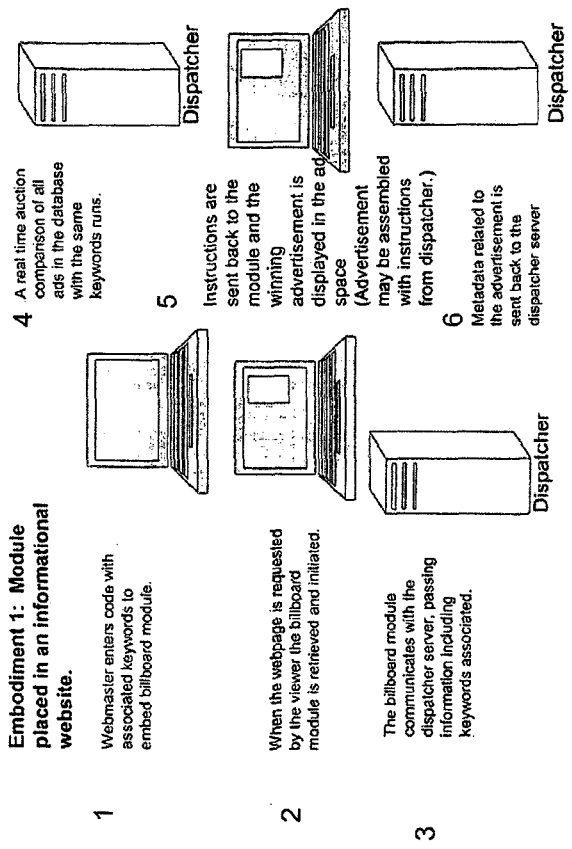
FIG. 36 describes the system process flow in an embodiment wherein the billboard module is embedded in an informational website.
Figure 37:
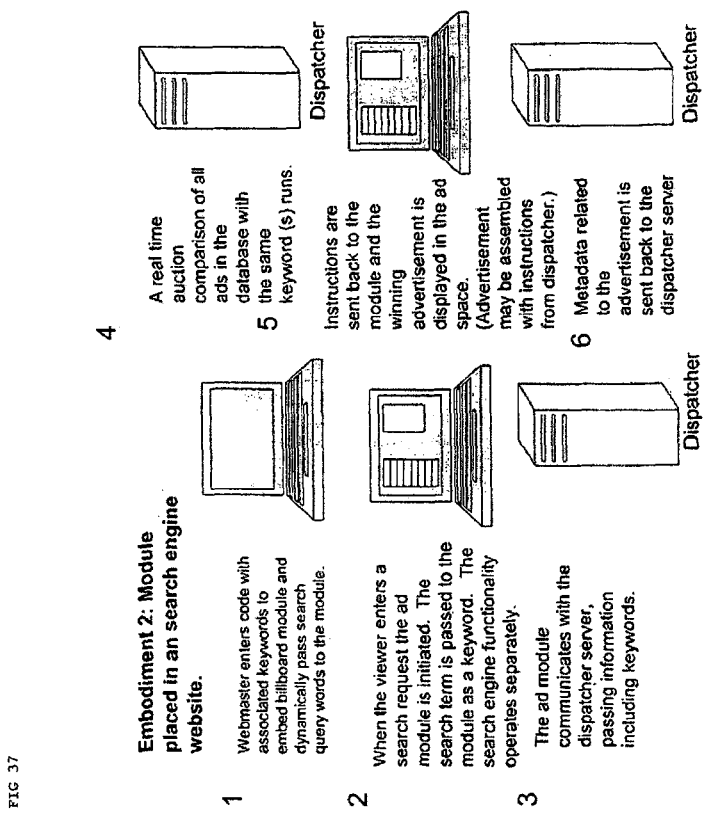
FIG. 37 describes the system process flow in an embodiment wherein the billboard module is embedded in a search engine screen.
Figure 38:
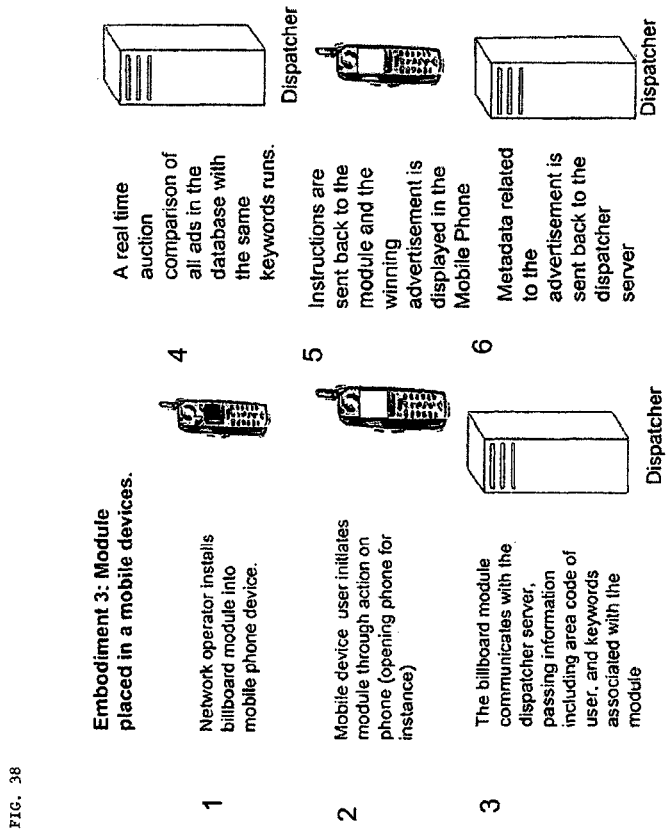
FIG. 38 describes the system process flow in an embodiment wherein the billboard module is embedded in a mobile device such as a cellular phone.
Figure 39:
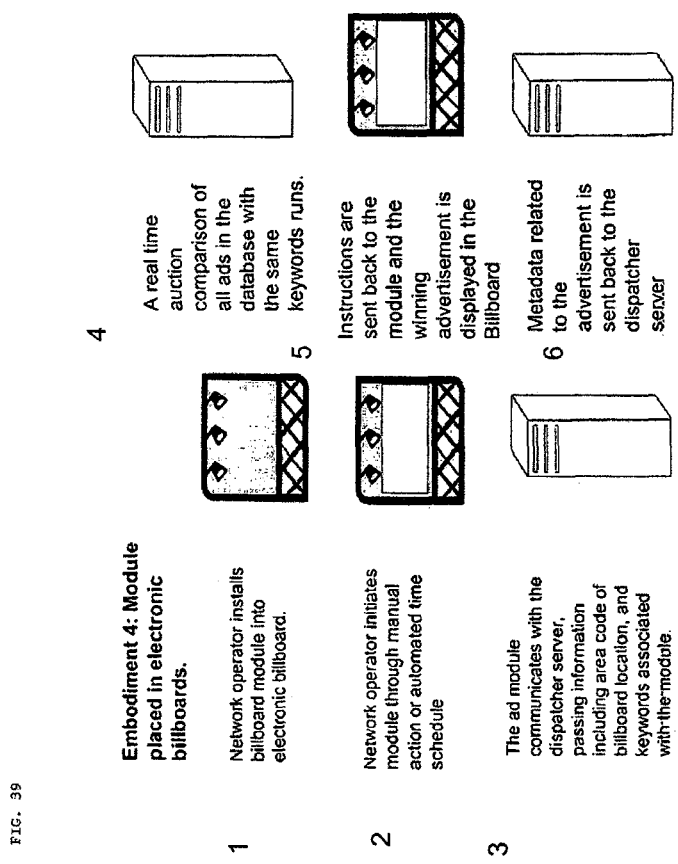
FIG. 39 describes the system process flow in an embodiment wherein the billboard module is embedded in an electronic billboard.

FIG. 36 describes the system process flow in an embodiment wherein the billboard module is embedded an informational website. FIG. 37 describes the system process flow in an embodiment wherein the billboard module is embedded in a search engine screen. FIG. 38 describes the system process flow in an embodiment wherein the billboard module is embedded in a mobile device such as a cellular phone. FIG. 39 describes the system process flow in an embodiment wherein the billboard module is embedded in an electronic billboard.

Figure 40:
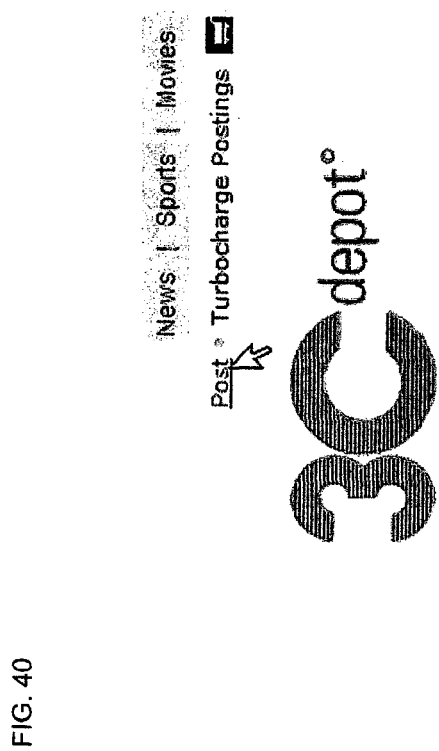
FIG. 40 depicts a sample system user screen for posting product catalog information in the system, enabling advertisement viewers to purchase the advertiser's product/service via the system e-commerce functionality.
Figure 42:
FIG. 42 depicts a sample product information and selection page.

FIG. 40 depicts a sample system user screen for position product/catalog information in the system, by advertiser that do not have their own e-commerce capability can sell their products to users that view their advertisements. Advertisers click on "post" to post their product information creating their own e-commerce catalog in the system and then connect their products to their ads, with the system providing the functionality to process orders, purchases and payment electronically. FIG. 41 depicts a sample system screen showing the posted products of advertisers. FIG. 42 depicts an information and selection page for the same products. When a viewer of the ad clicks on "buy," the system adds the item to a system electronic shopping chart and then completes processing of the purchase transaction, including payment processing. FIG. 43 shows a sample checkout payment screen. Various options for payment exist such as, without limitation, check, credit card, paypal or other forms of payment.

While the present invention has been shown and described herein in what are considered to be the preferred embodiments thereof, illustrating the results and advantages over the prior art obtained through the present invention, the invention is not limited to those specific embodiments. Thus, the forms of the invention shown and described herein are to be taken as illustrative and other embodiments may be selected without departing from the spirit and scope of the present invention.

What is claimed is:

1. A system comprising:
a database configured to store a plurality of records comprising:
one or more commands for retrieving one or more of a plurality of electronic content files designated by one or more advertiser users;
one or more commands for assembling and presenting the one or more designated electronic content files as an advertisement at one or more of a plurality of webpages; and
one or more parameters for presentation of the advertisement at the one or more webpages; and
one or more computing systems operable to:
generate, in response to one or more options selected by a particular one of the one or more advertiser users in a user interface, first code for placement at a particular one of the one or more webpages, the first code written to cause a billboard module to be loaded when the particular webpage is loaded, the billboard module comprising second code written to:
communicate, over one or more computer networks, with the one or more computing systems; and
retrieve and display one or more advertisements on the particular webpage;
select, in response to a communication from the billboard module over the one or more computer networks, a subset of the plurality of records, the selection based at least in part on one or more keywords in the communication from the billboard module;
after selecting the subset of the plurality of records based at least in part on the one or more keywords in the communication from the billboard module, conduct an auction to select a winning advertisement from the selected subset of records; and
provide instructions to the billboard module for the billboard module to retrieve the winning advertisement and present the winning advertisement in an area on the particular webpage designated by the billboard module.

2. The system of claim 1, wherein:
the billboard module is operable to transmit one or more messages to the one or more computing systems over the one or more computer networks, the messages comprising one or more of:
tracking data pertaining to advertisement presentation;
usage of the retrieved winning advertisement;
usage of a particular webpage for presentation of the winning advertisement; and
an advertisement viewer's activity with respect to the winning advertisement; and
the billboard module utilizes file server direct connection in transmitting the messages.

3. The system of claim 1, the one or more computing systems further operable to:
permit the advertiser users to upload product and services information; and
conduct e-commerce transactions involving purchase of the products or services from the advertiser users in response to an advertisement of the advertiser users.

4. The system of claim 1, wherein the one or more parameters comprise one or more of:
an advertisement audience geographic location;
an advertisement audience demographic category;
a webpage subject matter category;
a topic keyword;
a content file usage cost;
a webpage usage cost;
a webpage payment option;
an advertisement click-through destination;
advertisement presentation space dimensions;
a click-through rate;
a display region; and
an advertisement type.

5. The system of claim 4, wherein the one or more computing systems comprise an algorithm operable to select the winning advertisement based on a plurality of advertiser user bids for placement of the advertiser users' advertisements at the plurality of webpages.

6. The system of claim 1, wherein the one or more computing systems comprise a dispatcher server and a tracking server.

7. The system of claim 1, wherein the one or more computer networks comprises the Internet.

8. The system of claim 1, wherein the one or more computer networks comprises a cable communications network.

9. The system of claim 1, wherein the one or more computer networks comprises a cellular communications network.

10. The system of claim 1, wherein the one or more computer networks comprises a satellite communications network.

11. The system of claim 1, wherein the one or more computer networks comprises a combination of two or more networks selected from the group consisting of local area computer networks, wide area computer networks, the Internet, cable communications networks, satellite communications networks, television frequency networks, radio frequency communications networks, and cellular communications networks.

12. The system of claim 1, wherein the billboard module is activated by an access to the particular webpage wherein the billboard module is placed.

13. The system of claim 1, wherein the billboard module is activated by a click on a link at the particular webpage wherein the billboard module is placed.

14. The system of claim 1, wherein the billboard module is activated by a click on a symbol at the particular webpage the billboard module is placed.

15. The system of claim 1, wherein the billboard module is activated by entering a term as a query on a search engine, the billboard module being placed at the search engine.

16. The system of claim 5, wherein each advertiser user bid comprises a total bid covering a fee for use of the one or more electronic content files and a fee for use of the one or more webpages.

17. The system of claim 1, wherein at least one of the plurality of webpages are operable to be displayed on a wireless mobile device display screen.

18. The system of claim 1, the one or more computing systems further operable to provide one or more user interfaces operable to:

permit the one or more advertiser users to:
    select the one or more electronic content files;
    provide customized text content to be presented in the advertisement; and
    designate the one or more webpages and the one or more parameters for presentation of the advertisement at the one or more designated webpages; and
permit one or more webpage providers to make available one or more of the plurality of webpages for presentation of advertisements.

19. The system of claim 1, the one or more computing systems further operable to:
    calculate one or more fees associated with use of the electronic content files and of the webpages;
    bill the advertiser users for use of the electronic content files;
    bill the advertiser users for presentation of the electronic content files at the one or more webpages;
    provide payment to one or more content licensors for use of the electronic content files; and
    provide payment to one or more webpage providers providing for use of the webpages.

20. The system of claim 1, wherein the billboard module is further operable to:
    designate the area for the displayed advertisement;
    retrieve the one or more of the plurality of electronic content files associated with the particular record; and
    display the retrieved one or more of the plurality of electronic content files associated with the particular record.

21. The system of claim 1, wherein:
    the communication from the billboard module comprises one or more of:
        one or more categories; and
        dimension of the designated area for the displayed advertisement.

22. The system of claim 1, wherein the instructions provided to the billboard module for the billboard module to retrieve and present the winning advertisement comprises instructions stored in a record of the subset of records associated with the winning advertisement.

23. A method comprising:
    receiving a designation of one or more content files stored in a content server, the one or more content files made available for use in creating an advertisement;
    receiving one or more parameters for presentation of the advertisement;
    receiving a designation of one or more of a plurality of webpages for presentation of the advertisement;
    storing a plurality of records in a database, a particular record comprising:
        a network address of the designated one or more webpages;
        a server location address for the designated one or more content files; and
        one or more advertisement parameters and tracking parameters;
    generating, in response to one or more options selected by an advertiser user in a user interface, first code for placement at a particular webpage, the first code written to cause a billboard module to be loaded when the particular webpage is loaded, the billboard module comprising second code written to:
        communicate, over one or more computer networks, with one or more computing systems; and
        retrieve and display one or more advertisements on the particular webpage;
    selecting, based on a communication from the billboard module over the one or more computer networks, a subset of the plurality of records, the selection based at least in part on one or more keywords in the communication from the billboard module;
    after selecting the subset of the plurality of records based at least in part on the one or more keywords in the communication from the billboard module, conducting an auction to select a winning advertisement from the selected subset of records; and
    providing one or more instructions to the billboard module for the billboard module to retrieve and present the winning advertisement within a space on the particular webpage designated by the billboard module.

24. The method of claim 23, further comprising storing in the particular record one or more of:
    one or more keyword terms;
    a cost for use of the one or more content files;
    a cost for use of the one or more webpages; and
    one or more commands for retrieving, assembling, and presenting the one or more content files and customized text content as an advertisement.

25. The method of claim 23, wherein the one or more advertisement parameters comprise one or more of the following parameters: an advertisement audience geographic location, an advertisement audience demographic category, a webpage subject matter category, a topic keyword, a bid of a system advertiser for presentation of an advertisement of the system advertiser, a content file usage cost, a webpage usage cost, a webpage payment option, an advertisement click-through destination, advertisement presentation space dimensions, a click-through rate, and a presentation region and advertisement type.

26. The method of claim 23, wherein selecting the winning advertisement is based on advertiser user bids.

27. The method of claim 23, wherein the billboard module is activated by an access to the particular webpage wherein the billboard module is placed.

28. The method of claim 23 wherein the billboard module is activated by a click on a link on the particular webpage wherein the billboard module is placed.

29. The method of claim 23, wherein the billboard module is activated by a click on a symbol at the particular webpage the billboard module is placed.

30. The method of claim 23 wherein the billboard module is activated by entering a term as a query on a search engine, the billboard module being placed at the search engine.

31. The method of claim 26, wherein each bid comprises a total bid covering a fee for use of the one or more electronic content files and a fee for use of the one or more webpages.

32. The method of claim 23, wherein at least one of the plurality of webpages are operable to be displayed on a wireless mobile device display screen.

33. A system comprising:
    a system-end computer communicatively coupled with one or more electronic content servers and one or more computer networks, the one or more electronic content servers having stored thereon a plurality of content files;
    a dispatcher server communicatively coupled with the system-end computer and one or more webpages on the one or more computer networks;
    a database operable to store one or more records comprising:

commands for retrieving from the one or more electronic content servers one or more of the plurality of content files designated by a system advertiser user;

one or more commands for presenting the one or more content files as an advertisement; and one or more parameters for presentation of the advertisement at one or more of the webpages;

wherein the dispatcher server is operable to:

generate, in response to one or more options selected by the system advertiser user in a user interface, first code for placement at the one or more webpages, the first code written to cause a billboard module to be loaded when a particular webpage is loaded, the billboard module comprising second code written to:

communicate, over the one or more computer networks, with the dispatcher server; and retrieve and display one or more advertisements on the particular webpage;

select, in response to a communication from the billboard module, a subset of the records, the selection based at least in part on one or more keywords in the communication from the billboard module;

after selecting the subset of the plurality of records based at least in part on the one or more keywords in the communication from the billboard module, conduct an auction to select a winning advertisement from the selected subset of records; and provide instructions to the billboard module for the billboard module to retrieve winning advertisement and present the winning advertisement in an area on the particular webpage designated by the billboard module.

34. The system of claim 33, wherein the one or more parameters comprise one or more of the following parameters: an advertisement audience geographic location, an advertisement audience demographic category, a webpage subject matter category, a topic keyword, a bid of a system advertiser for presentation of an advertisement of the system advertiser, a content file usage cost, a webpage usage cost, a webpage payment option, an advertisement click-through destination, advertisement presentation space dimensions, a click-through rate, and a presentation region and advertisement type.

35. The system of claim 33, wherein the dispatcher server selects the winning advertisement based on system advertiser user bids.

36. The system of claim 33, wherein the one or more computer networks comprises the Internet.

37. The system of claim 33, wherein the one or more computer networks comprises a cable communications network.

38. The system of claim 33 wherein the one or more computer networks comprises a cellular communications network.

39. The system of claim 33, wherein the one or more computer networks comprises a combination of two or more networks selected from the group consisting of local area computer networks, wide area computer networks, the Internet, cable communications networks, satellite communications networks, television frequency networks, radio frequency communications networks, and cellular communications networks.

40. The system of claim 33, wherein the dispatcher server is also the tracking server.

41. The system of claim 35, wherein each bid comprises a total bid covering a fee for use of the one or more electronic content files and a fee for use of the one or more webpages.

42. The system of claim 33, wherein at least one of the plurality of webpages are operable to be displayed on a wireless mobile device display screen.

* * * * *